US011772054B2

(12) United States Patent
Haneline

(10) Patent No.: US 11,772,054 B2
(45) Date of Patent: Oct. 3, 2023

(54) RARE EARTH TREATMENT OF MEMBRANES TO REMOVE CONTAMINANTS

(71) Applicant: Neo Water Treatment, LLC, Greenwood Village, CO (US)

(72) Inventor: Mason Reames Haneline, Orange, CA (US)

(73) Assignee: Neo Water Treatment, LLC, Greenwood Village, CO (US)

( * ) Notice: Subject to any disclaimer, the term of this patent is extended or adjusted under 35 U.S.C. 154(b) by 70 days.

(21) Appl. No.: 17/210,373

(22) Filed: Mar. 23, 2021

(65) Prior Publication Data
US 2021/0291122 A1 Sep. 23, 2021

Related U.S. Application Data

(60) Provisional application No. 62/993,516, filed on Mar. 23, 2020.

(51) Int. Cl.
| | | |
|---|---|---|
| *B01D 67/00* | (2006.01) | |
| *B01D 69/02* | (2006.01) | |
| *B01D 71/02* | (2006.01) | |
| *B01D 71/34* | (2006.01) | |
| *B01D 71/42* | (2006.01) | |
| *B01D 71/68* | (2006.01) | |
| *C02F 101/10* | (2006.01) | |
| *C02F 101/36* | (2006.01) | |
| *B01D 69/12* | (2006.01) | |
| *C02F 1/44* | (2023.01) | |

(52) U.S. Cl.
CPC ....... *B01D 71/022* (2013.01); *B01D 67/0079* (2013.01); *B01D 69/02* (2013.01); *B01D 69/12* (2013.01); *B01D 71/34* (2013.01); *B01D 71/42* (2013.01); *B01D 71/68* (2013.01); *C02F 1/44* (2013.01); *B01D 2323/12* (2013.01); *B01D 2323/36* (2013.01); *B01D 2325/02* (2013.01); *C02F 2101/103* (2013.01); *C02F 2101/105* (2013.01); *C02F 2101/36* (2013.01)

(58) Field of Classification Search
CPC ...... B01D 71/022; B01D 71/34; B01D 71/42; B01D 71/68; B01D 67/0079
See application file for complete search history.

(56) References Cited

U.S. PATENT DOCUMENTS

| | | | |
|---|---|---|---|
| 3,507,804 A | 4/1970 | Ropp | |
| 3,956,118 A | 5/1976 | Kleger et al. | |
| 5,340,556 A | 8/1994 | Collin et al. | |
| 5,562,889 A | 10/1996 | Collin et al. | |
| 9,233,863 B2 | 1/2016 | Hassler et al. | |
| 2004/0168980 A1 | 9/2004 | Musale et al. | |
| 2005/0061753 A1 | 3/2005 | Dickinson | |
| 2006/0231499 A1 | 10/2006 | Brummett | |
| 2008/0223783 A1 | 9/2008 | Sutton | |
| 2009/0223903 A1 | 9/2009 | Coffey et al. | |
| 2010/0264084 A1* | 10/2010 | Midorikawa | ........ B01J 20/0211 210/85 |
| 2010/0288698 A1 | 11/2010 | Liao et al. | |
| 2011/0303871 A1 | 12/2011 | Burba | |
| 2012/0074071 A1 | 3/2012 | Hassler et al. | |
| 2012/0103909 A1 | 5/2012 | Burba et al. | |
| 2012/0187047 A1 | 7/2012 | Cable et al. | |
| 2012/0187337 A1 | 7/2012 | Hassler et al. | |
| 2012/0223022 A1 | 9/2012 | Hassler et al. | |
| 2012/0261347 A1 | 10/2012 | Hassler et al. | |
| 2012/0261611 A1 | 10/2012 | Hassler et al. | |
| 2019/0127246 A1 | 5/2019 | Haneline et al. | |

FOREIGN PATENT DOCUMENTS

| | | |
|---|---|---|
| CN | 109437503 A | 3/2019 |
| CN | 109607753 A | 4/2019 |
| CN | 109701499 A | 5/2019 |
| KR | 20150073484 A * | 7/2015 |
| WO | 2000024680 A1 | 5/2000 |
| WO | 2012100264 A1 | 7/2012 |
| WO | 2012141895 A1 | 10/2012 |
| WO | 2012141896 A1 | 10/2012 |
| WO | 2012141897 A1 | 10/2012 |
| WO | 2016015328 A1 | 4/2016 |
| WO | 2016015329 A1 | 4/2016 |

(Continued)

OTHER PUBLICATIONS

Jung Mie Won et al—KR-20150073484-A FIT Translation—2015 (Year: 2015).*
International Search Report and Written Opinion issued in PCT/US2021/023768 dated May 27, 2021.
Ko, Y.G., et al., "CeO2-covered nanofiber for highly efficient removal of phosphorus from aqueous solution", Journal of Hazardous Materials 307 (2016), pp. 91-98.
Rotzetter, A.C.C., et al., "Combining Phosphate and Bacteria Removal on Chemically Active Filter Membranes Allows Prolonged Storage of Drinking Water", Adv. Mater. 25 (2013) pp. 6057-6063.
Gao, "Effect of lanthanum chloride (LaCl3) and cerium sulfate (Ce(SO4)2) on filterability of MBR sludge", Journal of Shanghai Ocean University (2014) 23(6); pp. 1-2 English Abstract www.shhydxxb.com/shhy/ch/reader/view_abstract.aspx?file_no=20140401092&flag=1.

(Continued)

*Primary Examiner* — Bradley R Spies
(74) *Attorney, Agent, or Firm* — Melissa M. Hayworth; George C. Lewis; Merchant & Gould PC

(57) ABSTRACT

A rare earth coated membrane is beneficial to aid in the separation of contaminants, such as anions containing phosphorous, anions containing arsenic, PFAS, and mixtures thereof. Membranes with the rare earth coating or treatment can have larger pore sizes than would be expected to remove these contaminants. Disclosed herein are methods for treating or coating the membrane to provide the rare earth coated membrane. The coated membranes can be used to remove contaminants, such as anions containing phosphorous, anions containing arsenic, and PFAS, from liquid feeds, such as water or water-based feeds.

18 Claims, 10 Drawing Sheets

(56) References Cited

FOREIGN PATENT DOCUMENTS

WO        2019089954 A1    5/2019

OTHER PUBLICATIONS

Ji, Shi-feng, et al., "Effect of lanthanum chloride (LaCl3) and cerium sulfate (Ce(SO4)2) on filterability of MBR sludge", Journal of Shanghai Ocean University (2014) 23(6) English abstract, p. 910 http://www.shhydxxb.com.
Garain, S., et al., "Enhancement of Electroactive β-phase and Superior Dielectric Properties in Cerium Based Poly (vinylidene fluoride) Composite Films", Materials Today: Proceedings 5 (2018) 10084-10090.
Muthumareeswaran, M.R., et al., "Feed concentration and pH effect on arsenate and phosphate rejection via polyacrylonitrile ultrafiltration membrane", Journal of Membrane Science 468 (2014) pp. 11-19.
He, J., et al., "Highly Efficient Phosphate Scavenger Based on Well-Dispersed La(OH)3 Nanorods in Polyacrylonitrile Nanofibers for Nutrient-Starvation Antibacteria", ACS Nano 9(9) (2015) pp. 9292-9302.
Koh, K.Y., "Improvement of Ultrafiltration for Treatment of Phosphorus-Containing Water by a Lanthanum-Modified Aminated Polyacrylonitrile Membrane", ACS Omega (2020) 5, 7170-7181.
Chen, L., et al., "In situ formation of La(OH)3-poly(vinylidene fluoride) composite filtration membrane with superior phosphate removal properties", Chemical Engineering Journal 347 (2018) 695-702.
Moradihamedani, P. and Abdul Halim Bin Abdullah, "Phosphate removal from water by polysulfone ultrafiltration membrane using PVP as a hydrophilic modifier", Desalination and Water Treatment 57 (2016) 25542-25550.
Binnemans, Koen, and Peter Tom Jones, "Rare Earths and the Balance Problem", Journal of Sustainable Metallurgy, pp. 1-29, 2015.
Neo et al., "Chemistry of Rare Earth Elements in Wastewater", Technology Chemistry in Wastewater (Sep. 24, 2017) pp. 1, 2, 6; https://neowatertreatement.com/wp-content/uploads/2017/09/RE Technology_Chemistry_in_Wastewater.pdf.
Neo, "Phosphorus Removal. Enhanced coagulation drives plant efficiency and performance", Albion Case Study RE100 (Sep. 24, 2017) entire document; https://neowatertreatement.com/wp-content/uploads/2017/09/Albion Case Study RE100.pdf.
Mixed Rare Earth Chloride, Material Safety Data Sheet, 2005, Advanced Material Resources.
Strileski, M., "Phosphorus Removal From EBPR Sludge Dewatering Liquors Using Lanthanum Chloride, Aluminum Sulfate and Ferric Chloride", UNLV Theses, Dissertations, Professional Papers, and Capstones, University of Nevada, Las Vegas 2013 pp. 1-84. https://digitalscholarship.unlv.edu/thesesdissertations.
Recht, H.L., and Masood Ghassemi, "Phosphate Removal from Wastewaters Using Lanthanum Precipitation", Atomics International for the Federal Water Quality Administration Department of the Interior, Program #17010 EFX, Contract #14-12-183 1970 pp. 1-65. https://books.google.com.
Guo, Y.; Woznicki, P; Barkatt, A.; Saad, E. E., "Sol-gel Synthesis of Microcrystalline Rare Earth Orthophosphates", J. Water. Res., 1996, 11, pp. 639-649, Abstract.
Onoda, H.; Funamoto, T., "Preparation and Fluorescence of Crystalline Gel Rare Earth Phosphates", J. Fluoresc. 2015, 25, pp. 247-251.
Zhu, D.; Chen, Q.; Qiu, T.; Zhao, G.; Fang, X., "Optimization of Rare Earth Carbonate Reactive-Crystallization Process Based on Response Surface Method", J. Rare Earths, in press corrected proof, https://doi.org/10.1016/j.ire.2020.03.011, pp. 1-7.
Iorhemen, O. T.; Hamza, R. A.; Tay, J. H., "Membrane Bioreactor (MBR) Technology for Wastewater Treatment and Reclamation: Membrane Fouling", Membranes, 2016, 6, pp. 1-29.
Wang, Z.; Ma, J.; Tang, C. Y.; Kimura, K.; Wang, Q.; Han, X., "Membrane Cleaning in Membrane Bioreactors: A Review", J. Membr. Sci., 2014, 468, pp. 276-307.
Wang, Z.; Wu, Z.; Yin, X.; Tian, L., "Membrane Fouling in a Submerged Membrane Bioreactor (MBR) Under Sub-Critical Flux Operation: Membrane Foulant and Gel Layer Characterization", J. Membr. Sci., 2008, 325, pp. 238-244.
Zhang, Z.; Wang, Y., Leslie, G. L.; Waite, T. D., "Effect of Ferric and Ferrous Iron Addition on Phosphorus Removal and Fouling in Submerged Membrane Bioreactors", Water Res., 2015, 69, pp. 210-222.
Field, E., et al., "Effects of Solids Retention Time in Membrane Bioreactors On Reverse Osmosis Membrane Fouling", Masters Thesis, The University of New Mexico, Albuquerque, NM, 2009.
Dupont FilmTecTM Reverse Osmosis Membranes Technical Manual; 2020; Version 3, Chapter 2.9 "Prevention of Iron and Manganese Fouling", pp. 72 and 73.
Orhanovic, Z.; Pokric, B.; Furedi, H.; Branica, M. "Precipitation and Hydrolysis of Metallic Ions. III. Studies on the Solubility of Yttrium and Some Rare Earth Hydroxides", Croat. Chem. Acta, 1966, 38, pp. 269-276.
Zhang, Z., "Phosphorus Removal and Membrane Fouling and Cleaning in Iron-dosed Submerged Membrane Bioreactor Treatment of Wastewaters", Ph.D. Dissertation, The University of New South Wales, Sydney, Australia, 2014.

\* cited by examiner

RARE EARTH TREATMENT OF MEMBRANES TO REMOVE CONTAMINANTS

This application claims priority to U.S. Provisional Application No. 62/993,516 filed Mar. 23, 2020, entitled "Rare Earth Treatment of Membranes to Separate Anions", the entire contents of which are hereby incorporated by reference in their entirety.

FIELD OF THE INVENTION

The present application is directed to a membrane with a rare earth treatment or coating. The resulting membrane restricts the permeability of certain contaminants, including anions containing phosphorus, through the membrane. The present application further relates to methods of making these membranes with a rare earth coating or treatment and methods of utilizing the membranes to remove contaminants or undesired anions, such as anions containing phosphorous, from a water based feed.

INTRODUCTION

Membranes for water filtration can be made from polyvinylidene difluoride (PVDF), polyethersulfone (PES), polysulfone (PS), polyacrylonitrile (PAN), polyvinylchloride (PVC), polyethylene (PE), and polypropylene (PP) to name a few. The membranes can be made with varying pore sizes, which are generally classified as follows: around 0.1 micron is considered microfiltration (MF); around 0.01 micron is considered ultrafiltration (UF); 0.001 micron is considered nanofiltration (NF); and 0.0001 micron is considered reverse osmosis (RO). Generally, MF and UF operate at low pressure and remove suspended content while NF and RO operate at high pressure and remove dissolved content. An example of MF or UF can be found in the membrane bioreactors (MBR) in wastewater treatment plants. An example of RO is the desalination process where drinking water is produced from sea water.

In all of these filtrations, the water that passes through the membrane is known as the permeate, while the water that does not pass is called the reject. The amount of rejected water is an important factor in the operation of these filter systems. NF and RO systems tend to have higher amounts of rejected water and as the salt concentration increases, the pressure required also increases. The high pressure and high amount of rejected water of these applications can be a hindrance to their implementation. High pressure raises safety concerns and requires a lot of energy. Also, the rejected water, which is now concentrated in contaminants, can present a disposal problem. MF and UF systems operate at lower pressure and have less reject water but are only capable of removing suspended particles and macromolecules. Multivalent ions due to water hardness or monovalent ions, such as sodium and chloride, easily pass through these membranes.

Membranes that can efficiently and effectively remove contaminants, including undesired ions, continue to be needed.

SUMMARY

As disclosed herein, the present material is a membrane which is coated with a rare earth agent. The membrane can have pore sizes ranging from approximately 0.001 to 0.9 microns and the rare earth coating limits the permeability of contaminants that would otherwise pass through the membrane.

Disclosed herein is a membrane for water filtration. The membrane has a pore size of approximately 0.001 to 0.9 microns and has a rare earth coating so that the membrane limits contaminants permeability through the membrane which contaminants would otherwise pass through the membrane based on the pore size.

In certain embodiments, the rare earths are Ce, La, or a mixture of cerium and lanthanum. In certain embodiments of the membrane for water filtration, the membrane is polyvinylidene difluoride (PVDF), polyethersulfone (PES), or polyacrylonitrile (PAN). In certain embodiments of the membrane for water filtration, the contaminants to be excluded are anions containing phosphorous, perfluoroalkyl substances (PFAS), anions containing arsenic, or mixtures thereof.

Also as disclosed herein, the present methods are methods of coating a membrane with rare earths and methods for treating water with the rare earth coated membrane.

As disclosed, the method of making a membrane for water filtration comprises the following steps. A membrane with a pore size of approximately 0.001 to 0.9 micron is provided and the membrane is treated with an amount of rare earth agent to provide a membrane with a rare earth coating that limits contaminants permeability through the membrane.

The treating step may be repeated one or more times after a period of time. This method of making the membrane may be part of a water filtration method or system.

The method of treating water to remove contaminants comprises the following steps. A water stream containing a first concentration of one or more contaminants is passed through a membrane for water filtration, wherein the membrane has a pore size of approximately 0.001 to 0.9 micron and wherein the membrane has a rare earth coating. Then a membrane permeate water stream is obtained, wherein the permeate water stream has a permeate concentration of one or more contaminants less than the first concentration.

In certain embodiments, the permeate is monitored for the concentration of the one or more contaminants. If the contaminant concentration begins to increase over time and/or increases above a target concentration, the rare earth coating may be reapplied to the membrane. The treating step to reapply the rare earth coating may be repeated one or more times as the membrane is used and the membrane with the rare earth coating is no longer as effective in removing the contaminant(s). After reapplication of the rare earth coating the membrane again effectively removes the contaminant(s).

These methods of making membranes include the step of coating a membrane with rare earth, which includes passing a solution or filtering a slurry of a rare earth salt through the membrane, or soaking the membrane in the solution or slurry, and thus depositing the rare earth on the membrane. After the membrane is coated with rare earth, the methods for treating water with this membrane include passing contaminated water through the membrane such that the permeate stream has a permeate concentration of the contaminant or undesired anion(s) less than the initial contaminant or anion concentration. In certain embodiments, the undesired anions are anions containing phosphorous. In certain other embodiments, the undesired anions are anions containing arsenic. In other embodiments, the contaminants can be perfluoroalkyl substances (PFAS).

One embodiment of the present invention is a membrane coated with a rare earth salt that is capable of excluding anions containing phosphorus from the permeate.

In another embodiment of the present invention, a membrane is exposed to a rare earth containing solution or slurry and the membrane is then capable of excluding anions containing phosphorus from the permeate.

The water treatment system includes a source of contaminated water containing contaminant(s), a membrane which is coated with a rare earth agent, a permeate, optionally rejected water, and optionally a sampling and analysis of the permeate for the contaminant(s).

DETAILED DESCRIPTION

Figure 1:
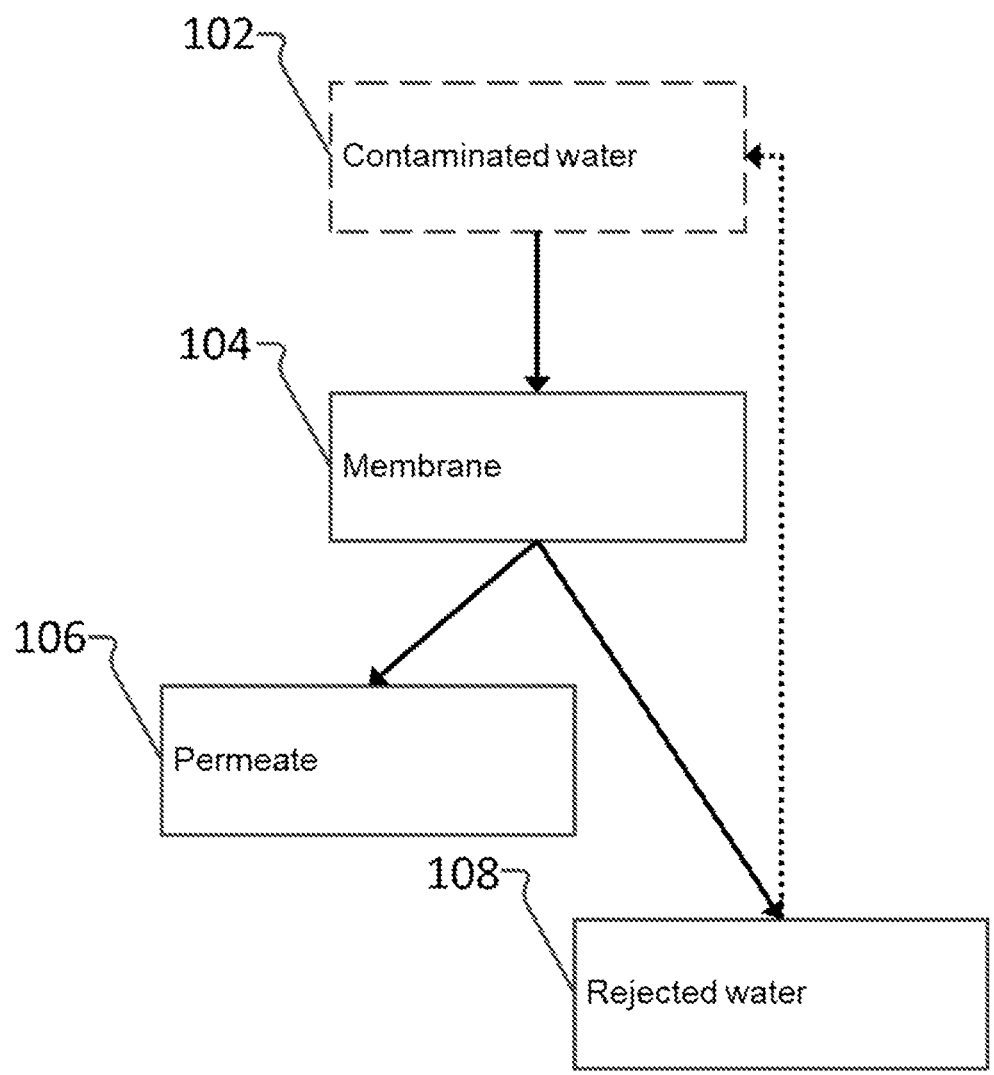
FIG. 1 illustrates a flowchart of an embodiment of an experimental process of using a membrane to treat water in a membrane filtration.

Before the rare earth (RE) treated membranes and methods are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise. Thus, for example, reference to "a cerium chloride" is not to be taken as quantitatively or source limiting, reference to "a step" may include multiple steps, reference to "producing" or "products" of a reaction or treatment should not be taken to be all of the products of a reaction/treatment, and reference to "treating" may include reference to one or more of such treatment steps. As such, the step of treating can include multiple or repeated treatment of similar materials/streams to produce identified treatment products.

The present application relates to a membrane with a rare earth coating or treatment that is capable of preventing contaminants or anions from passing through the membrane, which contaminants or anions would otherwise readily pass through. Membranes with the rare earth coating can have larger pore sizes than would be expected to remove these contaminants and remove the contaminants effectively and efficiently. These membranes may be used for water filtration and thus may be present in a water treatment system.

As described herein, a coating or treatment means the presence of rare earth on the surface of the membrane or embedded within the surface of the membrane that is exposed to the water to be treated. The rare earth may be associated with the surface of the membrane by an unbound attraction or may be chemically bound to the surface of the membrane in some manner. Accordingly, as described herein, the membrane coating or treatment includes both unbound attraction and chemically bound.

The rare earths on the membrane are present as rare earth compounds, such as salts. In certain embodiments, the rare earth coating is composed of rare earth salts that are water soluble or water insoluble. For example, in certain embodiments, the rare earth salts include halides (e.g., chlorides, fluorides), phosphates, sulfates, sulfonates, carbonates, hydroxides, oxides, and the like, or mixtures of these salts.

The rare earth coating occupies the space just before the membrane and/or is on the surface or within the surface of the membrane relative to the designed direction of water flow. The thickness of the rare earth coating can range from approximately 1 atom thick to approximately millimeters thick. The rare earth coating need not be complete or of consistent thickness over the entire surface of the membrane.

The present application further relates to methods of using rare earth agents to make membranes with a rare earth coating or treatment and methods of treating water with these membranes. As used herein, "rare earth agents" mean the rare earth solution or slurry used to create the coating on the membrane. The methods of treating water as disclosed herein may include the steps for making the membranes with the rare earth coating or treatment and during the method of treating water, the steps for making the membrane with the rare earth coating or treatment may be repeated.

When using the membranes to treat or filter water, the membranes remove contaminants from the water to provide a permeate with a reduced concentration of contaminants relative to the untreated water. The treated water may have a reduced concentration of contaminants that achieves a target concentration or that is below a target concentration. When using the membranes to treat water, the rare earth coating or treatment may be applied to the membrane once or the rare earth coating or treatment may be applied multiple times as the water treatment progresses. Using the membranes with a rare earth coating or treatment allows for effective and efficient treatment of water to remove contaminants. These contaminants can be undesired anions.

The membrane can be composed of polyvinylidene difluoride (PVDF), polyethersulfone (PES), polysulfone (PS), polyacrylonitrile (PAN), polyvinylchloride (PVC), polyethylene (PE), polypropylene (PP) or combinations thereof. In certain embodiments, the membrane is PVDF, PAN, or PES.

The membrane may be configured in any way suitable for filtration of a feed. For example, the membrane may be configured as a long cylinder, such as hollow fibers, capillaries, or tubes, as flat sheets, either rolled up or maintained in a flat condition, or as various monolithic designs. Common membrane shapes that may be utilized include, flat sheet, tubular, hollow fiber, and monolith.

The pore size for the membrane can range from the NF range (0.001 micron) to the MF range (0.1 micron). As such, the membranes as described herein have a pore size of approximately 0.001 microns to approximately 0.9 microns. In certain embodiments, the membranes can have a pore size of approximately 0.01 microns to approximately 0.5 microns. The pore size of the membrane is such that one of skill in the art would not expect the contaminants (including undesired anions) to be excluded from the permeate. However, with the rare earth coating, the membrane unexpectedly is able to exclude an amount of the contaminants (including undesired anions) from the permeate to achieve a lower or target concentration of the contaminant in the permeate.

The contaminants are contaminants that typically are removed when treating or filtering water. The contaminants can be undesired anions. This can be any water treatment. For example, this treatment or filtration of water may be part of treating a wastewater stream or treating/filtering water to provide drinking water.

For example, in certain embodiments, the contaminants are anions containing phosphorus. When the contaminants are anions containing phosphorous, the rare earth coating removes more anions containing phosphorous than would be removed merely by potential preferential binding to the rare earth coating on the membrane. Thus, the rare earth coating is capable of excluding an amount of the anions containing phosphorus from the permeate to achieve a lower concentration in the permeate than would be expected. In other embodiments, the contaminants are anions containing arsenic or PFAS, and the rare earth coating is capable of excluding an amount of these contaminants from the permeate to achieve a lower concentration in the permeate than the feed and lower than would be expected.

In one specific embodiment, the membrane may be a flat sheet with a pore size of approximately 0.1 microns. In another embodiment, the membrane may be a flat sheet with a pore size of approximately 0.2 microns. In yet another embodiment, the membrane may be a flat sheet with a pore size of approximately 0.03 microns. In a further embodiment, the membrane may be a hollow fiber with a pore size of approximately 0.04 microns.

The coating or treatment on the membranes as described herein is composed of rare earths. Specifically, the rare earths (RE) as used herein are cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y), and mixtures thereof. The light rare earth elements include cerium (Ce), lanthanum (La), praseodymium (Pr), neodymium (Nd), promethium (Pm), samarium (Sm), and mixtures thereof and these light rare earths may be utilized as the membrane coating or treatment.

In the membranes and methods as disclosed herein, the rare earths can be any one of these rare earths or a mixture of rare earths. The rare earths as present in the coating are rare earth salts, such as halides (e.g., chlorides, fluorides), phosphates, sulfonates, sulfates, hydroxides, carbonates, oxides and the like, or a mixture of these salts.

Because of their chemical similarities, REs tend to occur together in minerals and rocks and they can be difficult to separate from each other. Accordingly, the rare earth agents and coatings disclosed herein can be mixtures of rare earths. In some embodiments, the rare earth may a light rare earth element or a mixture of the light rare earth elements.

In certain embodiments, the rare earth is selected from the group consisting of cerium, lanthanum, yttrium, and mixtures thereof.

In particular embodiments, the rare earth of the rare earth coating is Ce, La, or a mixture of Ce and La. In these embodiments, trace amounts (i.e., less than 2%, and in some embodiments less than 1%, by weight of the total weight of rare earths) of other rare earths may be present. These other rare earth elements may be one or more of the light rare earth elements.

The rare earth coating or treatment may be applied by exposing the membrane to a rare earth agent. These rare earth agents are composed of water containing rare earth salts. The salts can be either water soluble (creating a solution) or water insoluble (creating a slurry). For example, the rare earth salts may be halides (e.g., chlorides, fluorides), phosphates, sulfates, hydroxides, sulfonates, carbonates, oxides, and the like, or mixture of these salts. In certain embodiments, the rare earth salts are chloride salts and in certain other embodiments the rare earth salts are phosphate salts.

In certain embodiments of the membrane with a rare earth coating, the rare earth coating is a mixture of Ce and La, with 55.0-75.0% by weight Ce, from 25.0-45.0% by weight La, and any balance being other rare earths, based on the total weight of rare earths. In one particular embodiment, the rare earth coating is a mixture of Ce and La with 55.0-75.0% by weight Ce and 25.0-45.0% La by weight, and the balance of other rare earth elements being less than 2% by weight, based on the total weight of rare earths. In certain embodiments, the balance of other rare earths is less than 1% by weight, based on the total weight of rare earths.

A coating of 59.8-70.1% Ce by weight and 29.9-40.1% La by weight, of 63.0-69.0% Ce by weight and 30.0-36.0% La by weight, and of 64.0-68.0% Ce by weight and 31.0-35.0% La by weight (with or without trace amounts of other rare earths) are all further embodiments. In a specific embodiment, the rare earth coating is 59.8-70.1% by weight Ce, 29.9-40.1% by weight La, and any balance of being one or more other rare earth elements, wherein the balance is less than 1% by weight.

In additional embodiments, the rare earth is 60.0-65.5% mol Ce and 30.0-40.0% mol La based on the total moles of rare earths and any balance being one or more other rare earths.

Additional embodiments include rare earth coatings of 59.8-70.1% Ce and 29.9-40.1% La, of 63.0-69.0% Ce and 30.0-36.0% La, and of 63.0-68.0% Ce and 31.0-35.0% La (all with any balance being one or more other rare earths and all based on the total moles rare earths). In certain embodiments, the balance of any other rare earths is less than 2% or less than 1%.

The other rare earth elements that may be present are any one or more of the other rare earth elements. These other rare earth elements may be selected from the group consisting of Pr, Nd, Sm, Y, and mixtures thereof.

Embodiments of the rare earth coating also include a mixture of Ce and La with 25.0-35.0% Ce and 12.0-20.0% La and the balance being other rare earths. In certain of these embodiments, the balance of other rare earth elements is greater than about 45% or is about 50% or greater. The balance may be a single rare earth or mixture of rare earths (that are not Ce and La). For example, the other rare earths may be about 50% Y, or about 50% Sm, or a mixture of about 25% Sm and about 25% Y.

In certain embodiments, the rare earth is Ce, La, or a mixture of Ce and La, all with less than 2% of other rare earths. In particular embodiments, the rare earth is Ce, La, or a mixture of Ce and La, all with less than 1% of other rare earths.

For the purposes of this application unless otherwise specified, % of a rare earth is % of rare earth by mol relative to total mol of all rare earths in the composition, without regard to the anion (such as chloride or phosphate) if the rare earth is in salt form and without regard to any other trace salts of non-rare earths that may be present or included in the composition (such as NaCl). Similarly if the % is identified as weight %, it is relative to total weight of all rare earths in the composition, without regard to the anion (such as chloride or phosphate) if the rare earth is in salt form and without regard to any other trace salts of non-rare earths that may be present or included in the composition (such as NaCl). Common impurities found in rare earths as utilized herein include sodium, iron, lead, and uranium.

As disclosed herein, the present membrane is a membrane with a rare earth coating or treatment that is capable of rejecting anions/contaminants from permeating the membrane or limiting anion/contaminant permeability through the membrane. The rare earth coating may be in the form of a rare earth salt, such as chloride or phosphate.

The contaminants to be removed from the water can be dissolved anions. These contaminants are typically removed when treating water. The contaminants in the water to be treated that can be rejected or limited by the membranes with rare earth coating or treatment are selected from the group consisting of anions containing phosphorous, halides, anions containing arsenic, perfluoroalkyl substances (PFAS), anions containing sulfur, and the like and, mixtures thereof.

Anions containing phosphorous include phosphates, phosphites, organophosphates, polyphosphates, and mixtures thereof. Polyphosphates are salts or esters of polymeric oxyanions formed from $PO_4$ (phosphate) structure units linked together by sharing oxygen atoms. Polyphosphates include for example, triphosphoric acid, cyclic trimetaphosphate, and the like. Organophosphates are organic compounds including one or more phosphate ester groups. Organophosphates include for example phosphonates.

As described herein, perfluoroalkyl substances (PFAS) include compounds such as perfluorooctanesulfonate (PFOS), perfluorohexanesulfonate (PFHxS), Nafion by-product 2, 6:2 fluorotelomer sulfonate (6:2 FTSA), 8:2 FTSA, perfluorobutanesulfonate (PFBS), F-53B, and the like. Perfluoroalkyl substances (PFAS) are as described in "A guide to the PFAS found in our environment. Chemical structures and origins of per- and polyfluoroalky substances that are polluting our world", C&EN: CAS (a division of the American Chemical Society) (2020) https://cen.acs.org/sections/pfas.html, the contents of which are incorporated by reference in their entirety.

Anions containing arsenic include arsenates, arsenites, organoarsenates, and mixtures thereof.

Anions containing sulfur include sulfates, sulfonates, and mixtures thereof.

As described herein, sulfonates are $R-SO_3H$ ($R-SO_3^-$ for the anion); phosphonates are $R-PO_3H_2$ ($R-PO_3H^-$ or $R-PO_3^{-2}$ for the anions), arsenates are the same as phosphonates but with As instead of P. The R represents any carbon based group such as alkyl, aryl, ether, and the like. A specific example of a phosphonate is dimethyl methylphosphonate, and an example of an organoarsenic compounds is Roxarsone.

In certain embodiments, the contaminants are selected from the group consisting of anions containing phosphorus, PFAS, anions containing arsenic, and mixtures thereof. In particular embodiments, the contaminants are selected from the group consisting of phosphates, PFAS, and arsenates.

With the rare earth coating, the membrane unexpectedly is able to exclude an amount of the contaminants from the permeate, achieving a lower or target concentration of the contaminant in the permeate. This amount is more than would be expected by the contaminant/undesired anion merely preferentially binding to the rare earth coating on the membrane. As such, the membranes with the rare earth coating or treatment are useful for water treatment in which contaminants/undesired anions are removed or reduced.

Techniques for measuring the contaminant concentration in the permeate are well known in water treatment and target concentrations of these contaminants in the treated water or permeate are also well known in water treatment. For some of these contaminants, the EPA has set legal limits, depending on the intended use of the water.

Method of Making the Membrane

The present application relates to methods of making a membrane for water filtration including treating the membrane with an amount of rare earth agent to provide a membrane with a rare earth coating or treatment capable of limiting or preventing contaminants (including certain anions) from passing through the membrane, which contaminants would otherwise readily pass through. The method of making a membrane for water filtration includes the steps of selecting or providing a membrane with a pore size of approximately 0.001 to 0.9 micron and then treating the membrane with an amount of rare earth agent to provide a membrane with a rare earth coating that limits the contaminants permeability through the membrane. The treating step may be repeated one or more times after a period of time. This method of making the membrane may be part of a water filtration method or system.

In particular embodiments, the step of treating the membrane may include the steps of exposing the membrane to a solution of phosphate by passing the phosphate solution through the membrane or soaking the membrane in the phosphate solution and then exposing the membrane to a rare earth chloride solution by passing the rare earth chloride solution through the membrane or soaking the membrane in the rare earth chloride solution.

In general, the membrane is treated or coated by exposing the surface of the membrane to a solution or slurry containing the rare earth. This solution or slurry containing the rare earth is referred to herein as a rare earth agent. The rare earth can be a soluble salt (creating a solution) or an insoluble salt suspended in a liquid (creating a slurry). The soluble rare earth salts can be rare earth chloride. The insoluble rare earth salts can be rare earth carbonate, hydroxide, phosphate or a combination thereof. The liquid of the solution or slurry is water, as such, the rare earth agent is an aqueous mixture.

The rare earth coating may be applied by depositing the rare earth salt onto the membrane from a rare earth slurry or may be applied by precipitating a rare earth salt onto the membrane from a soluble rare earth salt solution. In some embodiments of utilizing a slurry, the rare earth slurry is a rare earth phosphate slurry and the rare earth phosphate slurry may be prepared from a rare earth chloride solution that is added to a phosphate solution. In some embodiments of precipitating a rare earth salt onto the membrane, a rare earth chloride solution may be utilized and the rare earth may be precipitated onto the membrane as a phosphate by soaking the membrane in a phosphate solution and then exposing the membrane to a rare earth chloride solution or passing a phosphate solution through the membrane and then passing the rare earth chloride solution through the membrane.

In these embodiments of preparing the membrane, the rare earth chloride solution (used to either prepare the slurry or precipitate the rare earth onto the membrane) can be a solution of rare earth chloride salts selected from $CeCl_3$, $LaCl_3$, or a mixture of $CeCl_3$ and $LaCl_3$. In certain embodiments, the rare earth chloride salts used are 55.0-75.0% by weight $CeCl_3$, from 25.0-45.0% by weight $LaCl_3$, and any balance being chloride salts of other rare earth elements, based on the total weight of rare earths. In particular embodiments, the rare earth chloride salts used are 55.0-75.0% by weight Ce and 25.0-45.0% La by weight, and the balance of any other rare earth elements being less than 2% by weight, based on the total weight of rare earths. In certain embodiments, the balance of other rare earth elements is less than 1% by weight, based on the total weight of rare earths.

Chloride salts of 59.8-70.1% Ce by weight and 29.9-40.1% La by weight, of 63.0-69.0% Ce by weight and 30.0-36.0% La by weight, and of 64.0-68.0% Ce by weight and 31.0-35.0% La by weight (with or without trace amounts of other rare earth chlorides) are all further embodiments of the rare earths chlorides that can be used to prepare the coated membranes.

In further embodiments, the rare earth salt used is 59.8-70.1% by weight of chloride salts of Ce, 29.9-40.1% by weight of chloride salts of La, and any balance of being chloride salts of any one or more other rare earth elements, wherein the balance is less than 1% by weight.

Additional embodiments include rare earth chloride salts having a mixture of $CeCl_3$ and $LaCl_3$ with the 60.0-65.0% Ce and 30.0-40.0% La and the balance (if any) being one or more of chloride salts of the other rare earth elements, based on the total moles of rare earths. Chloride salts of 59.8-70.1% Ce and 29.9-40.1% La, of 63.0-69.0% Ce and 30.0-36.0% La, and of 63.0-68.0% Ce and 31.0-35.0% La (all with the balance being one or more of chloride salts of the other rare earth elements) are all further embodiments of the Ce/La agent. In certain embodiments, the balance of chloride salts of other rare earth elements is less than 2% or less than 1%.

In embodiments in which the rare earth chloride salts are a mixture of Ce and La and the balance (if any) being chloride salts of other rare earth elements, the other rare earth elements may be any one or more of the other rare earth elements. These other rare earth elements may be selected from the group consisting of Pr, Nd, Sm, Y, and mixtures thereof.

Embodiments also include rare earth chloride salts having a mixture of $CeCl_3$ and $LaCl_3$ with 25.0-35.0% Ce and 12.0-20.0% La and the balance being one or more of chloride salts of the other rare earth elements. In certain of these embodiments, the balance of chloride salts of other rare earth elements is greater than about 45% or is about 50% or greater. The balance may be a single rare earth chloride or chloride salts of a mixture of rare earth elements. For example, the balance of chloride salts may be about 50% Y, or about 50% Sm, or a mixture of about 25% Sm and about 25% Y.

In an embodiment, the rare earth salt may be provided in hydrated crystal form (e.g., $RECl_3 \cdot xH_2O$ (where x is 1 to 8) or $REPO_4 \cdot xH_2O$ (where x is 0 or 1)).

In certain embodiments, the rare earth chloride used to prepare the coated membrane is $CeCl_3$, $LaCl_3$, or a mixture of $CeCl_3$ and $LaCl_3$, all with less than 2% chloride salts of other rare earth elements based on the total rare earths. And in particular embodiments, the rare earth chloride used to prepare the coated membrane is $CeCl_3$, $LaCl_3$, or a mixture of $CeCl_3$ and $LaCl_3$, all with less than 1% chloride salts of other rare earth elements.

Common impurities found in rare earths salts as utilized herein include sodium, iron, lead, and uranium. In certain embodiments the rare earth salt solutions or slurries (i.e., the rare earth agents) contain less than approximately 10 g/L of these common impurities. The rare earth salt solutions or slurries can include less than approximately 9 g/L of sodium, less than approximately 20 mg/L iron, less than approximately 3 mg/L lead, and less than approximately 1 mg/L uranium.

In embodiments where a rare earth slurry is utilized to make the coated membrane, the rare earth slurry can be prepared by preparing a phosphate solution and then adding a rare earth chloride solution to the phosphate solution to provide a rare earth phosphate slurry. This rare earth phosphate slurry may then be filtered through the membrane to provide the membrane with a rare earth coating or treatment.

In embodiments where the membrane with a rare earth coating is prepared by precipitating a rare earth salt onto the membrane from a soluble rare earth salt solution, first the membrane is exposed to a phosphate solution by pumping the phosphate solution through the membrane. Then the membrane is exposed to a soluble rare earth salt solution (such as a rare earth chloride solution) by pumping the rare earth salt solution through the membrane. This precipitates the rare earth coating onto the membrane.

The rare earth salt solution can be rare earth chloride solutions as described herein. The phosphate solution can be made using phosphoric acid or any soluble phosphate salt, such as mono, di, or tri basic potassium phosphate, mono, di, or tri basic sodium phosphate, mono, di, or tri basic calcium phosphate, and the like. The concentration of the phosphate solution utilized can be approximately 0.01 mg/L P to approximately 95 g/L P. In some embodiments, the concentration of the phosphate solution utilized can be approximately 0.04 mg/L P to approximately 15 mg/L P, and in certain instances approximately 0.07 mg/L P to approximately 12 mg/L P.

The concentration of the rare earth chloride solution utilized can be about 0.0005 mmol to about 3.0 mol rare earth. In some embodiments, the concentration of the rare earth chloride solution utilized can be approximately 0.0013 mmol/L RE to approximately 0.485 mmol/L RE, and in certain instances approximately 0.0023 mmol/L RE to approximately 0.388 mmol/L RE.

The methods for making the membrane having a rare earth coating or treatment includes the steps of providing a membrane with a pore size of approximately 0.001 to 0.9 micron and treating the membrane with an amount of rare earth agent to provide a membrane that limits contaminants permeability through the membrane. Treating the membrane includes exposing the membrane to the rare earth agent. As such, treating the membrane may include exposing the membrane to a solution containing the rare earth and precipitating the rare earth onto the membrane. In an alternative embodiment, treating the membrane includes exposing the membrane to a rare earth slurry and depositing the rare earth onto the membrane. The membrane can be exposed to the solution or slurry by passing the treatment solution through the membrane or by filtering the treatment slurry through the membrane and/or by holding the solution or slurry in contact with the membrane for a specified amount of time. The contact time may vary from about 30 seconds to 5 days. In certain embodiments, the contact time is 30 seconds to 15 hours.

The coated membrane then can be used for water filtration. This water filtration can be in any water treatment. For example, the water filtration may be part of treating wastewater or treating water for drinking.

The membrane may be treated one time to apply the rare earth coating or treatment or the membrane may be treated multiple times to apply and then re-apply the rare earth coating or treatment.

As described herein, the membrane can be composed of polyvinylidene difluoride (PVDF), polyethersulfone (PES), polysulfone (PS), polyacrylonitrile (PAN), polyvinylchloride (PVC), polyethylene (PE), polypropylene (PP) or combinations thereof. In certain embodiments, the membrane is PVDF, PAN, or PES.

To provide the coated membrane, the amount of rare earth agent can be from about 0.0005 mmol to about 3.0 mol rare earth/liter of water used to coat the membrane. The rare earth can be dosed as a rare earth salt as described herein.

In certain embodiments, the amount of rare earth in the coating/on the membrane can be from about 0.0001 mmol rare earth/$m^2$ of the membrane to about 0.05 mmol rare earth/$m^2$ of the membrane. In some embodiments, the amount of rare earth can be from about 0.01 mmol RE/$m^2$ to about 0.04 mmol RE/$m^2$ of the membrane. In other embodiments, the amount of rare earth is from about 0.0001 mmol RE/$m^2$ to about 0.043 mmol RE/$m^2$ of the membrane.

The rare earth solutions used to coat the membrane can be chloride salts of one or more rare earth elements. In one embodiment, the rare earth solution used is a solution of Ce, Le, or a mixture of Ce and La, as described herein.

In one particular embodiment, the method includes the steps of treating a PVDF, PAN, or PES membrane with a rare earth agent to yield a coated/treated membrane that rejects anions containing phosphorous or limits anions containing phosphorous permeability. The rare earth coating removes more of these anions than would be removed by phosphates preferentially binding to the rare earth coating on the membrane. Thus, the rare earth coating is capable of excluding an amount of anions containing phosphorus from the permeate to achieve a lower concentration of these anions in the permeate than would be expected.

Figure 2:
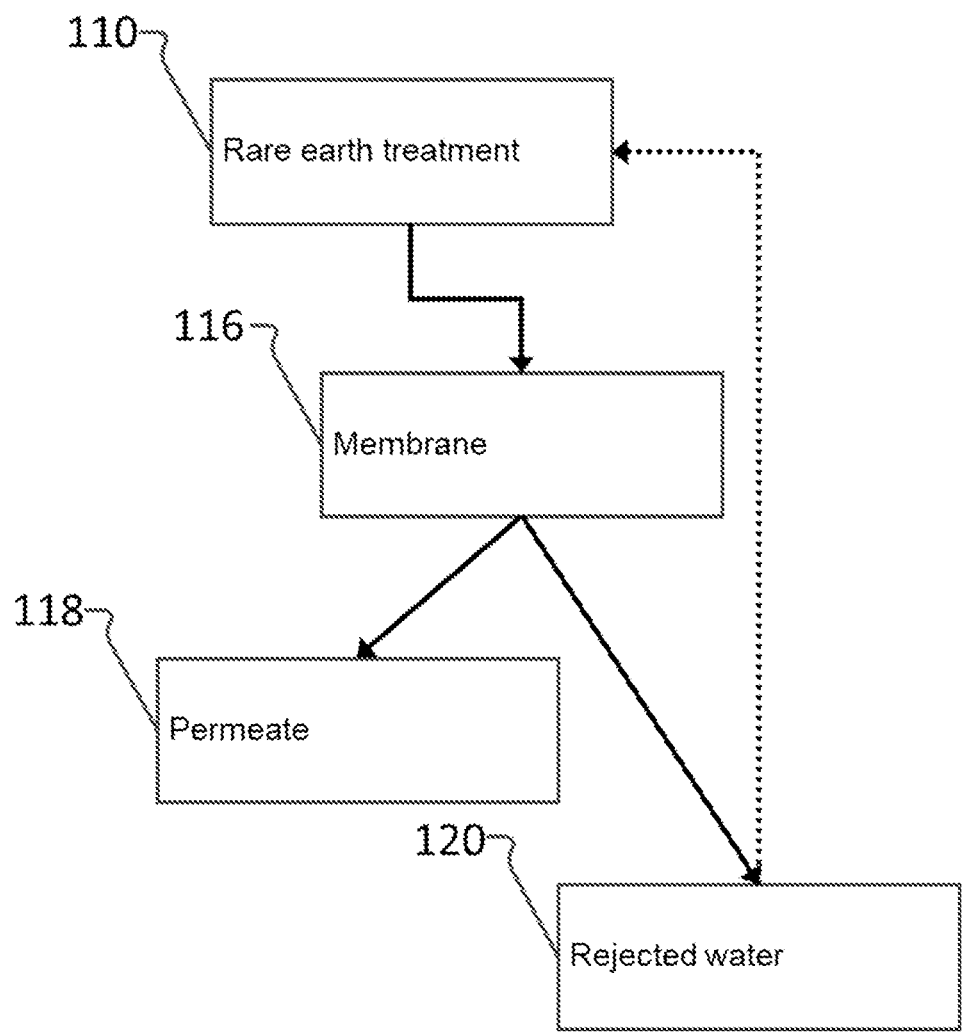
FIG. 2 illustrates a flowchart of an embodiment of an experimental process to make a membrane with a rare earth treatment or coating as disclosed herein.

FIG. 2 illustrates a process of treating a membrane with a rare earth agent to prepare a membrane with a rare earth coating or treatment as disclosed herein. In FIG. 2, a rare earth treatment 110 is passed over a membrane part 116. In doing so some pressure is created to push the water though the membrane. The water pushed through the membrane is the permeate 118 and the water not pushed through the membrane is rejected 120 and can be returned to the treatment 110. The membrane is thus treated with rare earth agent to provide a membrane with a rare earth coating.

The rare earth coating may be applied to the membrane once or may be reapplied one or more times as the membrane is used and the membrane with the rare earth coating is no longer as effective in removing the contaminant(s). After reapplication of the rare earth coating the membrane again effectively removes the contaminant(s). When a decrease in effectiveness is detected (i.e., the amount of contaminant/undesired anion in the permeate exceeds a target concentration), the rare earth coating may be reapplied to the membrane.

Water Treatment Method Using the Membranes

The present application relates to systems and methods of treating contaminated water with a rare earth coated membrane. For example, this method of treating contaminated water may be part of treating water for drinking or treating wastewater. Using the rare earth coated membrane to treat contaminated water allows for the efficient operation of the water treatment system or method while preventing the contaminants from permeating the membrane that would otherwise permeate the membrane. The methods of treating contaminated water as described herein may include the steps of the method of applying the rare earth coating to the membrane and the steps of reapplication as needed.

The method of treating water to remove contaminants comprises the steps of passing a water stream containing a first concentration of one or more contaminants through a membrane for water filtration, wherein the membrane has a pore size of approximately 0.001 to 0.9 micron and wherein the membrane has a rare earth coating; and obtaining a membrane permeate water stream having a permeate concentration of one or more contaminants less than the first concentration. The permeate concentration can be a target concentration. The target concentration can be determined or set based on the contaminant to be removed and well known accepted concentrations for that contaminant in treated water, depending on its intended end use.

The contaminant concentration in the permeate can be monitored by techniques well known to those of skill in the art. If the contaminant concentration in the permeate exceeds a target concentration as the water treatment progresses, the rare earth coating may be reapplied to the membrane as part of the water treatment process.

In certain embodiments, the contaminants to be removed from the water stream are anions containing phosphorous. Treating water by passing it through the membrane with a rare earth coating provides a permeate with a reduced concentration of contaminant to be removed (e.g., anions containing phosphorus) in comparison to the water feed. The membrane permeate stream can have a permeate concentration of phosphorus equal to or less than a target concentration of phosphorus. Anions containing phosphorous in the permeate may be monitored by techniques well known to those of skill in the art for analyzing streams for phosphorus. As such, these anions containing phosphorus may be monitored by analyzing for orthophosphate by Hach Method 8048 or Hach Method 10055 or Hach Method 8190.

The concentration of phosphorous in the permeate after passing through the coated membrane can be about 0.01 mg/L to about 3.0 mg/L and in certain preferred embodiments, about 0.01 mg/L to about 1.0 mg/L. The target concentration can be set at a certain amount of contaminant (e.g., phosphorus) per liter of water or can be set at the limit of detection.

In certain embodiments, the contaminants to be removed from the water stream are anions containing arsenic. Treating water by passing it through the membrane with a rare earth coating provides a permeate with a reduced concentration of contaminant to be removed (e.g., anions containing arsenic) in comparison to the water feed. The EPA has established well known legal limits for arsenic. The membrane permeate stream can have a permeate concentration of arsenic equal to or less than a target concentration of arsenic (e.g., the EPA legal limit). Anions containing arsenic in the permeate may be monitored by techniques well known to those of skill in the art for analyzing streams for arsenic. As such, these anions containing arsenic may be monitored by analyzing for As content using ICP-AES as described in EPA method 200.7.

The concentration of arsenic in the permeate after passing through the coated membrane can be about 10 ppb (μg/L), which is the drinking water limit for As. The target concentration can be set at this legal limit or can be set at the limit of detection.

In certain embodiments, the contaminants to be removed from the water stream are PFAS. Treating water by passing it through the membrane with a rare earth coating provides a permeate with a reduced concentration of contaminant to be removed (e.g., PFAS) in comparison to the water feed. The membrane permeate stream can have a permeate concentration of PFAS equal to or less than a target concentration of PFAS. PFAS in the permeate may be monitored by techniques well known to those of skill in the art. As such, PFAS may be monitored and analyzed by liquid chromatography/tandem mass spectrometry (LC/MS/MS) EPA method 537.1. The concentration of PFAS in the permeate after passing through the coated membrane can be set at target concentrations or can be set at the limit of detection. For example, target PFAS limitations can include about 150 ng/L PFOA, about 3.3 ng/L PFBS, about 6.5 ng/L PFHxS, and about 9.1 ng/L PFOS.

The US EPA has established health advisory levels for the combined concentrations of PFOA and PFOS in drinking water of 70 parts per trillion due to the persistence of these compounds in the environment, and subsequent bioaccumulation, and has issued Method 5371, which describes the quantification of 14 of these compounds in drinking water by LC/MS/MS.

The target concentration can also be set as a percentage reduction of the anion/contaminant in the permeate versus the concentration in the feed. In certain embodiments, the permeate concentration of contaminant (for example anions containing phosphorous) can be about 0.5% to 100% less than the feed concentrate. In certain embodiments, the permeate concentration of contaminant (for example anions containing phosphorus) is about 5 to 50% less than the feed concentration.

In certain embodiments of the methods of treating water, the permeate is monitored for the concentration of the contaminant (e.g., the anions containing phosphorus, anions containing arsenic, or PFAS). The monitoring can be continuous or be done periodically through sampling. In specific embodiments, if the contaminant concentration begins to increase over time or increases above the target concentration, the rare earth coating may be reapplied to the membrane. The rare earth coating may be reapplied by dosing the water to be treated with an appropriate amount of rare earth agent during the water treatment process to reestablish the coating or treatment on the membrane.

In example embodiments of removing anions containing phosphorous, a target phosphorus concentration may be set. The permeate is monitored and if the phosphorus concentration exceeds the target concentration, the membrane is retreated as described herein to establish the rare earth coating or treatment on the membrane. After reapplication of the rare earth coating the membrane again effectively removes the undesired anions containing phosphorous to be at or below the target concentration.

Treatment of contaminated water by a membrane is illustrated in FIG. 1. In FIG. 1, contaminated water or water to be treated part 102 is passed over a membrane part 104. In doing so some pressure is created to push the water though the membrane. The water pushed through the membrane is the permeate 106 and the water not pushed through the membrane is rejected 108 and returned to the contaminated water 102. The rejected water now has a higher contaminant concentration.

Figure 3:
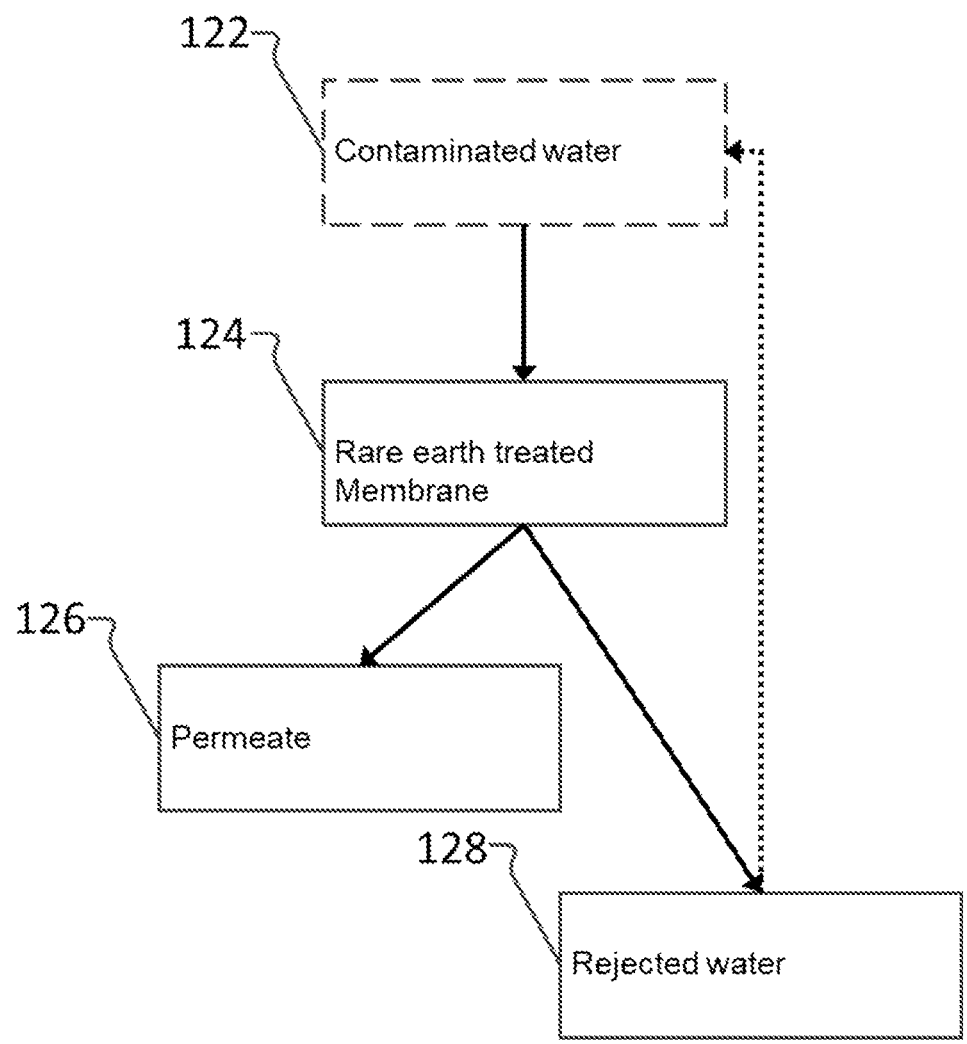
FIG. 3 illustrates a flowchart of an embodiment of an experimental process of using the membrane with a rare earth treatment or coating as disclosed herein to treat water to remove contaminants in a membrane filtration.

FIG. 3 illustrates treatment of water with a membrane having a rare earth coating or treatment. In FIG. 3, contaminated water or water to be treated part 122 is passed over a rare earth treated membrane part 124. In doing so some pressure is created to push the water though the membrane. The water pushed through the membrane is the permeate 126 and the water not pushed through the membrane is rejected 128 and returned to the contaminated water 102. The rejected water now has a higher contaminant concentration.

Figure 4:
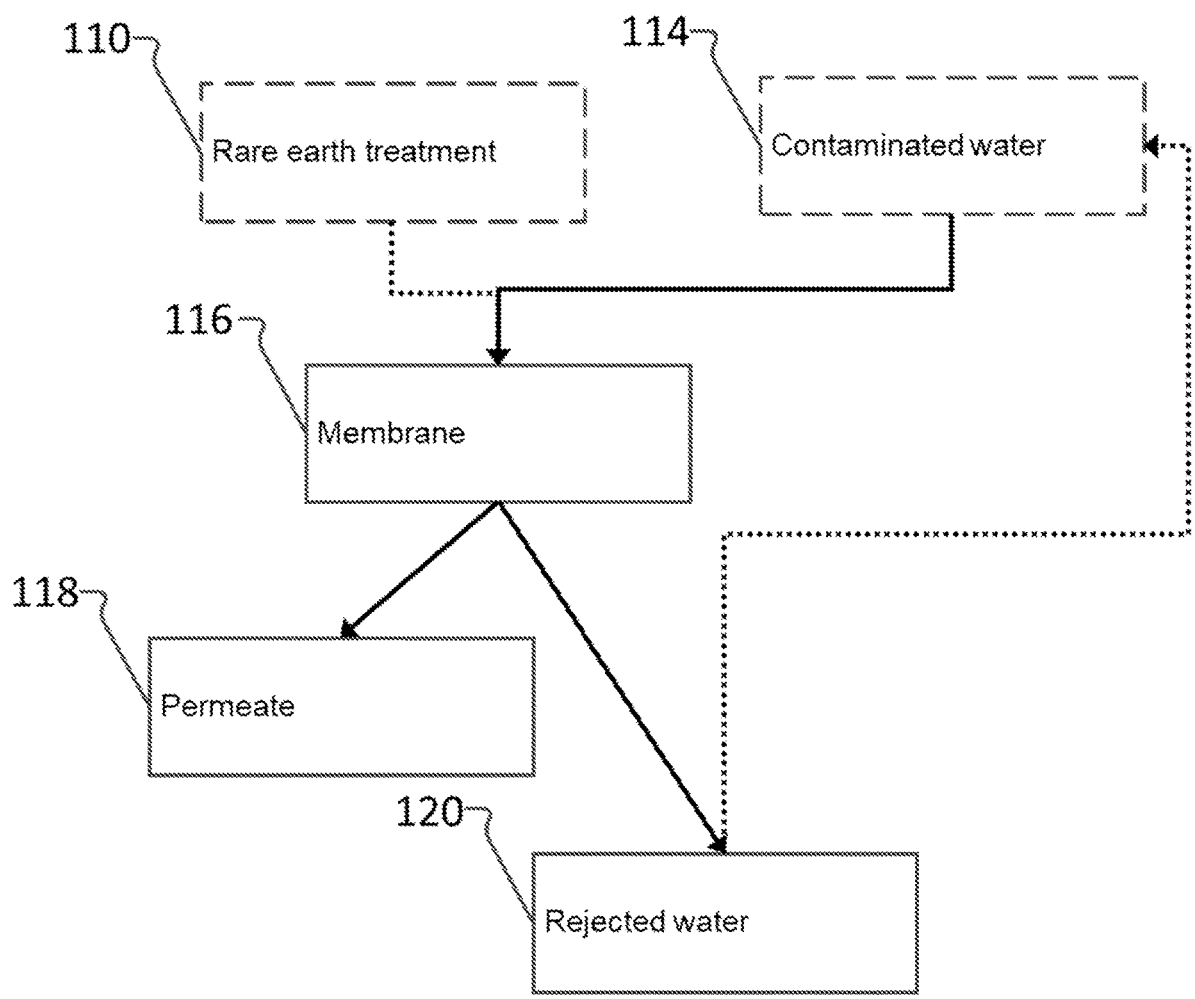
FIG. 4 illustrates a flowchart of an embodiment of an experimental process of treating a membrane with rare earths to provide a membrane with a rare earth treatment or coating as disclosed herein and utilizing the membrane to treat water to remove contaminants.

FIG. 4 illustrates both the treatment of the membrane to provide the rare earth coating and then treatment of contaminated water with the membrane having the rare earth coating. In FIG. 4, a rare earth treatment 110 is exposed to the membrane 116 to place a rare earth coating on the membrane. The contaminated water 114 is then passed over the membrane 116. In doing so some pressure is created to push the water though the membrane. The water pushed through the membrane is the permeate 118 which is now a lower concentration in contaminants due to the rare earth coating and the water not pushed through the membrane is rejected 120 and returned to the contaminated water 114. The rejected water now has a higher contaminant concentration.

In certain embodiments, the permeate is monitored for the concentration of contaminant (e.g., anions containing phosphorus, anions containing arsenic, or PFAS). If the contaminant concentration begins to increase over time or increases above a target concentration, the rare earth coating may be reapplied to the membrane. As such, during the water treatment process, the rare earth treatment 110 is re-exposed to the membrane to apply the rare earth coating on the membrane as contaminated water 114 also is passed through the membrane. The rare earth treatment 110 may be reapplied once or may be reapplied one or more times as the membrane is used and the membrane with the rare earth coating is no longer as effective in removing the contaminant(s). After reapplication of the rare earth coating the membrane again effectively removes the contaminant(s).

Figure 5:
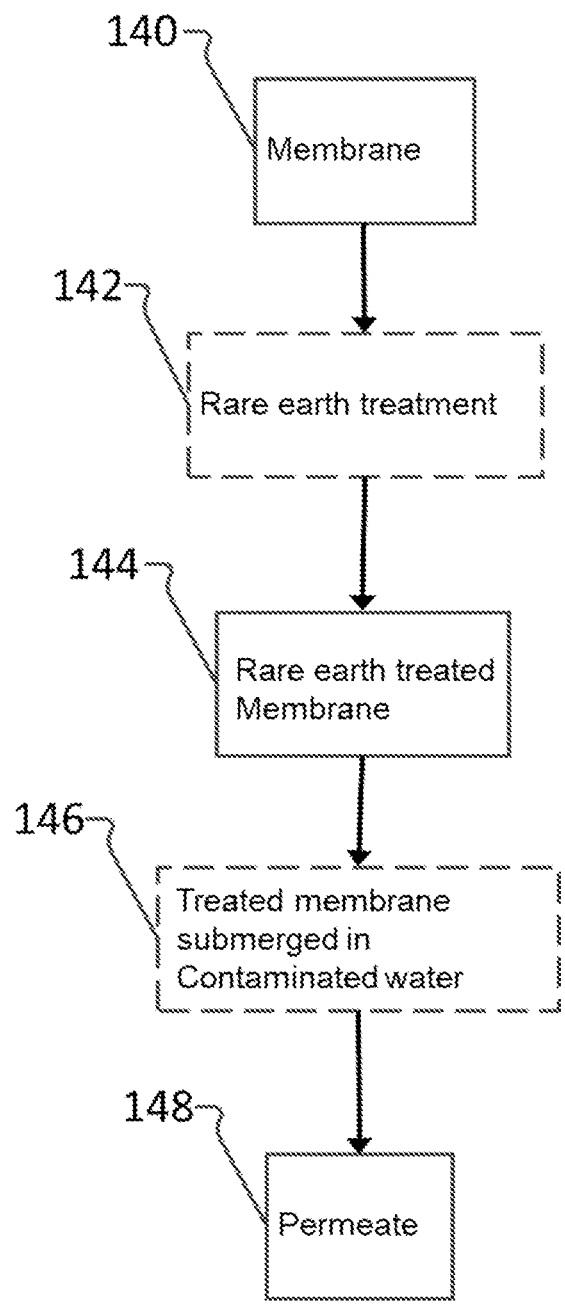
FIG. 5 illustrates a flowchart of an embodiment of an experimental process of treating a membrane with rare earths to provide a membrane with a rare earth treatment or coating as disclosed herein and utilizing the membrane as a submersible membrane to treat water to remove contaminants.

FIG. 5 illustrates a particular embodiment of treatment of the membrane to provide the rare earth coating and then treatment of contaminated water with the membrane having the rare earth coating. In FIG. 5, a membrane 140 is treated with rare earth by submersion in the rare earth treatment 142. The resulting rare earth treated membrane 144 is submerged in the contaminated water 146 and the permeate 148 is passed through the membrane.

EXAMPLES

The following Examples are provided to illustrate the inventive membranes and methods in more detail, although the scope of the invention is never limited thereby in any way. These examples demonstrate that for the controls, the concentration of the anion is approximately the same in the feed and the permeate. However, surprisingly, for the treated membranes, the concentration of the anion in the permeate is measurably lower than the concentration of the anion in the feed.

Analytical Methods Used

Orthophosphate (phosphate/phosphorus) was analyzed by Hach Method 8048 or Hach Method 10055.

Membranes Used

Hollow fiber membranes were obtained from Memstar and repotted as described in each example. Flat sheet membranes were purchased and used as is from Sterlitech Corporation.

Example 1

In one method for coating the membrane, a rare earth phosphate ($REPO_4$) slurry is filtered through the membrane under the normal operating conditions of the membrane. The rare earth slurry was prepared by first preparing a solution of potassium phosphate monobasic at a concentration of 6 mg/L P ($1.94 \times 10^{-4}$ mol/L), then adding a $RECl_3$ solution to reach a RE concentration of $1.94 \times 10^{-4}$ mol/L RE, then adjusting the pH to 7 with a NaOH solution. This formed a cloudy slurry of precipitated $REPO_4$. This slurry was then filtered through the membrane. The filtration was continued for at least 5 min up to 10 hrs.

Example 2

Another method for coating the membrane precipitates $REPO_4$ using $RECl_3$ in the presence of the membrane. A 4 L solution of potassium phosphate monobasic at a concentration of 6 mg/L P ($1.94 \times 10^{-4}$ mol/L) was pumped through the membrane at 8 ml/min and the permeate was returned to the feed tank. $RECl_3$ was then added by adding 0.3 ml of a 2.6 mol/L $RECl_3$ solution to achieve a target concentration of $1.94 \times 10^{-4}$ mol/L RE. The pH was then adjusted to 7 by addition of NaOH. The resulting cloudy feed solution of $REPO_4$ was continually pumped through the membrane for at least 5 min.

Example 3

A flat sheet PVDF membrane with 0.1-micron porosity was placed in a membrane cell. Tap water was pumped across the face of the membrane with a cross face velocity of 0.07 m/s until the flux through the membrane was consistent. The transmembrane pressure was 1 psi. The permeate and reject were returned to the feed container. After the flux stabilized phosphate was added to the feed to reach a target concentration of 3.5 mg/L P. The feed and permeate were measured for P concentration and had 3.5 and 3.4 mg/L P respectively. The feed was then dosed with a $RECl_3$ solution to reach a target rare earth concentration of 0.113 mmol/L to precipitate the P as $REPO_4$. The permeate was sampled and the resulting P concentration was 0.02 mg/L P. They system was then drained, flushed and refilled with tap water. Phosphate was again added to a target concentration of 3.5 mg/L P. After a few minutes the feed and permeate were sampled and analyzed. The feed was 3.2 mg/L P while the permeate was 0.1 mg/L P.

Example 4

A flat sheet PVDF membrane with 0.1-micron porosity was placed in a membrane cell. Distilled water was pumped across the face of the membrane with a cross face velocity of 0.185 m/s until the flux through the membrane was consistent. The transmembrane pressure was 0.44 psi. The reject was returned to the feed container and the permeate was collected in a separate container. After the flux stabilized the system was drained and loaded with a potassium phosphate monobasic water solution at a concentration of ~3 mg/L P. The pump was turned on and the permeate was collected in ~23 ml fractions. Fractions were analyzed for P content. The feed container was also sampled, filtered through a 0.45-micron filter, and analyzed for P content. This constitutes the control.

The system was then drained, and the membrane was coated as in Example 1 for a period of 3 hrs. The permeate was collected in a separate container.

The system was then drained and rinsed with distilled water. The system was then loaded with a potassium phosphate monobasic water solution at a concentration of ~3 mg/L P. The pump was turned on and the permeate was collected in ~23 ml fractions. Fractions were analyzed for P content. The feed container was also sampled, filtered through a 0.45-micron filter and analyzed for P content.

Figure 6:
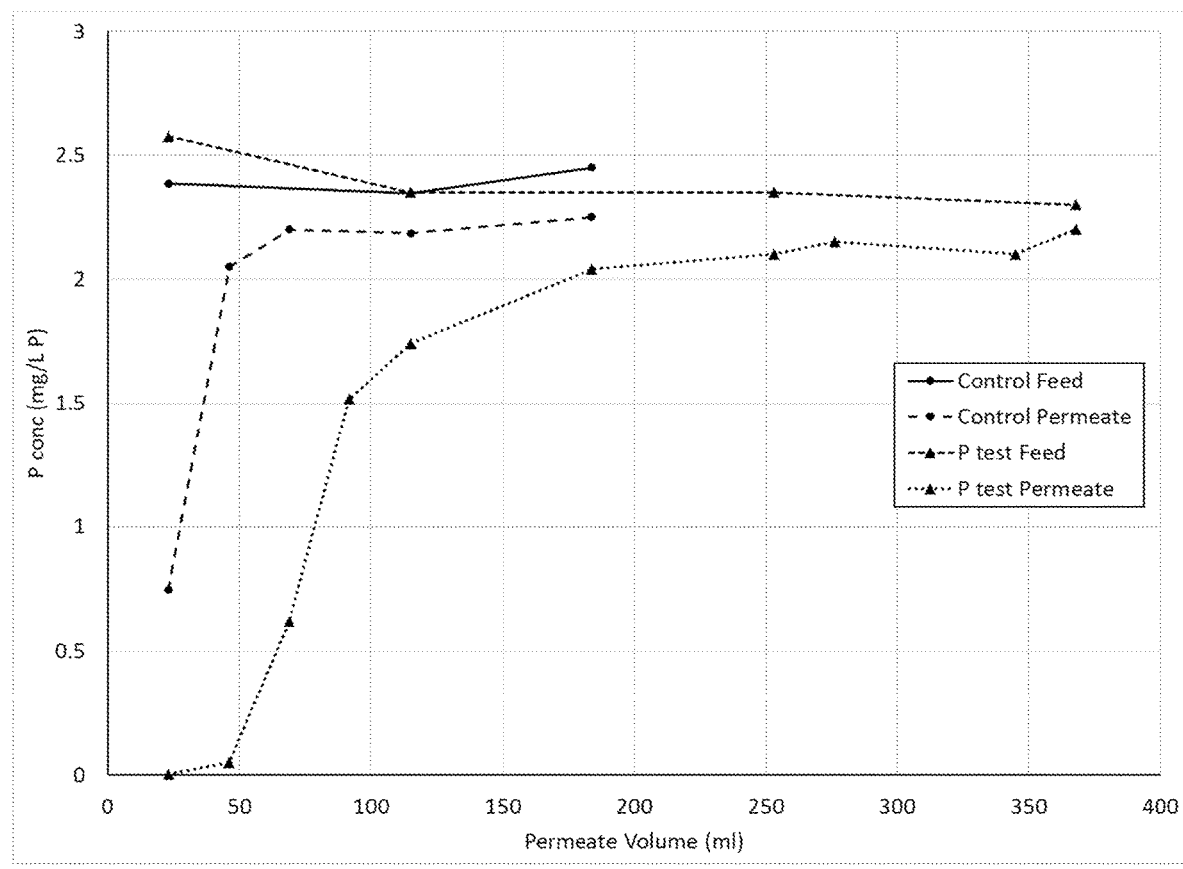
FIG. 6 graphically represents the sampled feed and permeate P concentrations (mg/L P) for the control and test for Example 4.

The analytical results are listed in the table below and graphically depicted in FIG. 6. As depicted, it is evident that in the absence of the rare earth coating, the phosphate is free to permeate the membrane and the permeate concentration quickly approaches the feed concentration. After exposure to rare earth the permeate concentration increases at a much slower rate indicating the coated membrane is restricting the permeation of phosphate.

| | Control | | Example 4 | |
|---|---|---|---|---|
| Permeate volume (ml) | Feed P Conc. (mg/L P) | Permeate P conc. (mg/L P) | Feed P conc. (mg/L P) | Permeate P conc. (mg/L P) |
| 23 | 2.385 | 0.745 | 2.575 | 0.005 |
| 46 | | 2.05 | | 0.05 |
| 69 | | 2.2 | | 0.62 |
| 92 | | | | 1.52 |
| 115 | 2.345 | 2.185 | 2.35 | 1.74 |
| 184 | 2.45 | 2.25 | | 2.04 |
| 253 | | | 2.35 | 2.1 |
| 276 | | | | 2.15 |
| 345 | | | | 2.1 |
| 368 | | | 2.3 | 2.2 |

Example 5

A flat sheet PVDF membrane with 0.2-micron porosity was placed in a membrane cell. Distilled water was pumped through the membrane in a dead-end setup until the flux through the membrane was consistent. The transmembrane pressure was 4.35 psi. The permeate was collected in a separate container. After the flux stabilized the system was drained and loaded with a potassium phosphate monobasic water solution at a concentration of ~3 mg/L P. The pump was turned on. The flow was initially cross flow to flush out the tubes between the feed tank and the membrane surface. After flowing for a few seconds, the valve was closed to operate in dead-end mode. The permeate was collected in ~23 ml fractions. Fractions were analyzed for P content. The feed container was also sampled, filtered through a 0.2-micron filter and analyzed for P content. This constitutes the control.

All valves were then opened to run in cross flow mode. The membrane was then coated as in example 2. The system was then operated in dead-end mode for approximately 30 min. The permeate was collected in a separate container.

Figure 7:
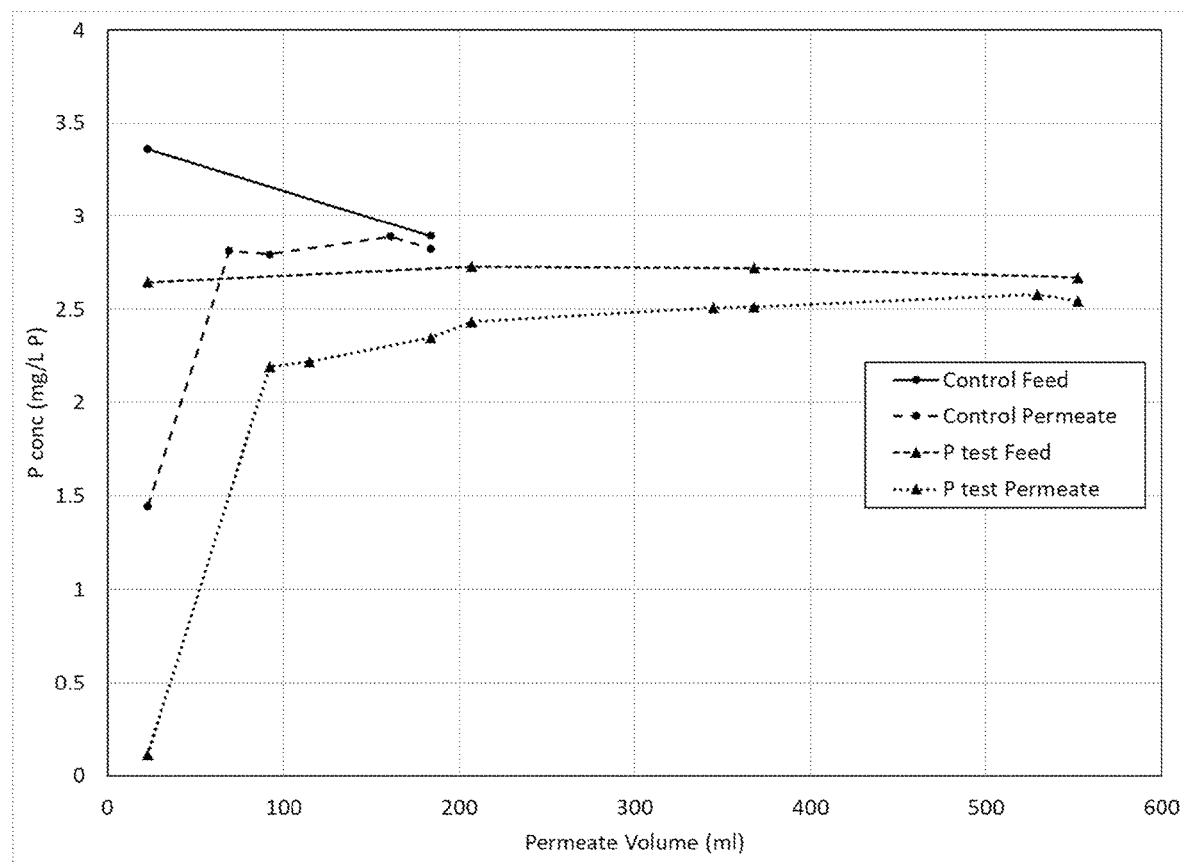
FIG. 7 graphically represents the sampled feed and permeate P concentrations (mg/L P) for the control and test for Example 5.

The system was then drained and rinsed with distilled water. The system was then loaded with a potassium phosphate monobasic water solution at a concentration of ~3 mg/L P. The system was started as in the control and the permeate was collected in ~23 ml fractions. Fractions were analyzed for P content. The feed container was also sampled, filtered through a 0.2-micron filter and analyzed for P content. The analytical results are listed in the table below and graphically depicted in FIG. 7.

As depicted, it is evident that in the absence of the rare earth coating, the phosphate is free to permeate the membrane and the permeate concentration quickly approaches the feed concentration. After exposure to rare earth the permeate concentration increases at a much slower rate indicating the coated membrane is restricting the permeation of phosphate.

|  | Control | | Example 5 | |
| --- | --- | --- | --- | --- |
| Permeate volume (ml) | Feed P conc. (mg/L P) | Permeate P conc. (mg/L P) | Feed P conc. (mg/L P) | Permeate P conc. (mg/L P) |
| 23 | 3.36 | 1.445 | 2.645 | 0.115 |
| 69 |  | 2.815 |  |  |
| 92 |  | 2.795 |  | 2.195 |
| 115 |  |  |  | 2.22 |
| 161 |  | 2.89 |  |  |
| 184 | 2.895 | 2.825 |  | 2.35 |
| 207 |  |  | 2.73 | 2.435 |
| 345 |  |  |  | 2.51 |
| 368 |  |  | 2.72 | 2.515 |
| 529 |  |  |  | 2.58 |
| 552 |  |  | 2.67 | 2.545 |

Example 6

A flat sheet PAN membrane with 400,000 Dalton porosity was placed in a membrane cell. Distilled water was pumped through the membrane in a dead-end setup until the flux through the membrane was consistent. The transmembrane pressure was 4.35 psi. The permeate was collected in a separate container. After the flux stabilized the system was drained and loaded with a potassium phosphate monobasic water solution at a concentration of ~3 mg/L P. The pump was turned on. The flow was initially cross flow to flush out the tubes between the feed tank and the membrane surface. After flowing for a few seconds, the valve was closed to operate in dead-end mode. The permeate was collected in ~23 ml fractions. Fractions were analyzed for P content. The feed container was also sampled, filtered through a 0.2-micron filter and analyzed for P content. This constitutes the control.

All valves were then opened to run in cross flow mode. The membrane was then coated as in Example 2. The system was then operated in dead-end mode for approximately 30 min. The permeate was collected in a separate container.

Figure 8:
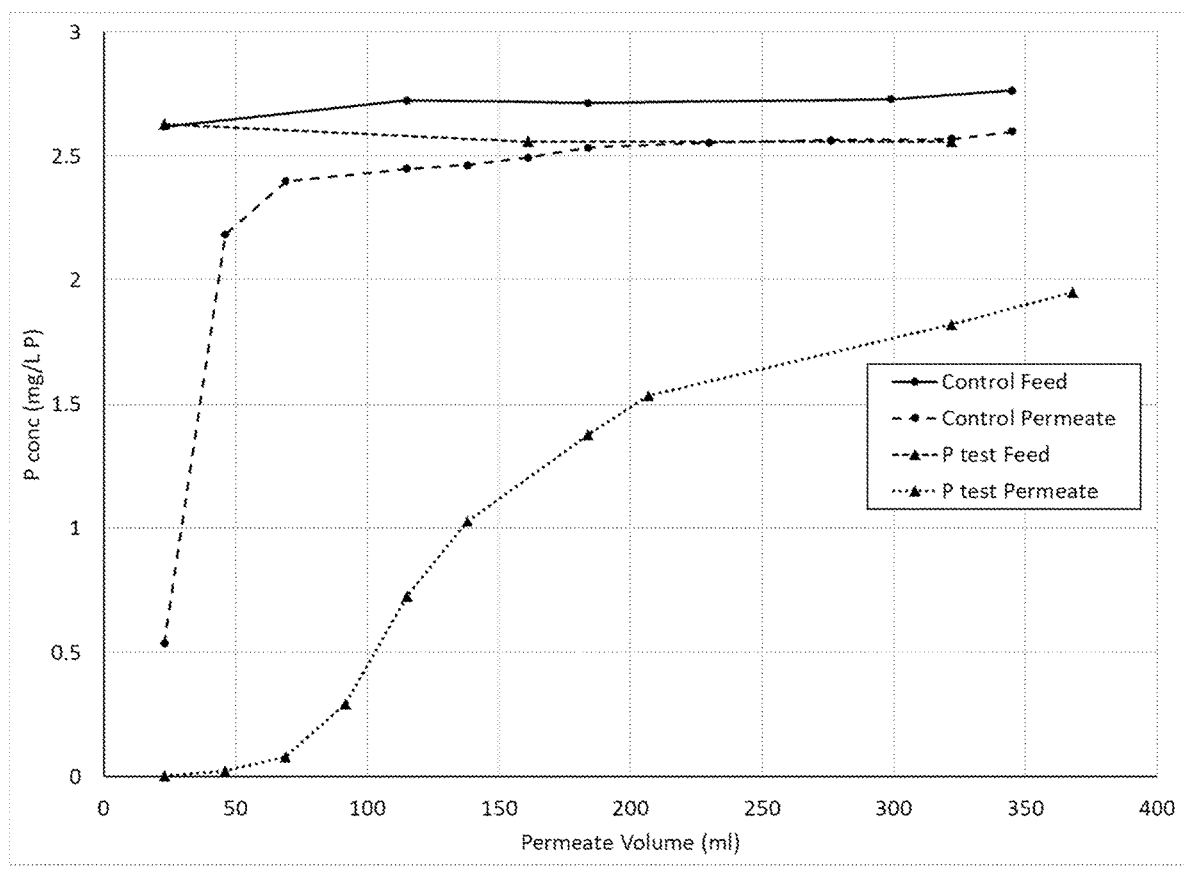
FIG. 8 graphically represents the sampled feed and permeate P concentrations (mg/L P) for the control and test for Example 6.

The system was then drained and rinsed with distilled water. The system was then loaded with a potassium phosphate monobasic water solution at a concentration of ~3 mg/L P. The system was started as in the control and the permeate was collected in ~23 ml fractions. Fractions were analyzed for P content. The feed container was also sampled, filtered through a 0.2-micron filter and analyzed for P content. The analytical results are listed in the table below and graphically depicted in FIG. 8.

As depicted, it is evident that in the absence of the rare earth coating, the phosphate is free to permeate the membrane and the permeate concentration quickly approaches the feed concentration. After exposure to rare earth the permeate concentration increases at a much slower rate. Furthermore, at the conclusion of this example the permeate concentration was significantly lower than the feed concentration. This indicates the coated membrane is restricting the permeation of phosphate.

|  | Control | | Example 6 | |
| --- | --- | --- | --- | --- |
| Permeate volume (ml) | Feed P conc. (mg/L P) | Permeate P conc. (mg/L P) | Feed P conc. (mg/L P) | Permeate P conc. (mg/L P) |
| 23 | 2.62 | 0.535 | 2.63 | 0.005 |
| 46 |  | 2.185 |  | 0.025 |
| 69 |  | 2.4 |  | 0.08 |
| 92 |  |  |  | 0.295 |
| 115 | 2.725 | 2.45 |  | 0.725 |
| 138 |  | 2.465 |  | 1.03 |
| 161 |  | 2.495 | 2.56 |  |
| 184 | 2.715 | 2.535 |  | 1.38 |
| 207 |  |  |  | 1.535 |
| 230 |  | 2.555 |  |  |
| 276 |  | 2.565 |  |  |
| 299 | 2.73 |  |  |  |
| 322 |  | 2.57 | 2.56 | 1.82 |
| 345 | 2.765 | 2.6 |  |  |
| 368 |  |  |  | 1.95 |

Example 7

A flat sheet PES membrane with 0.1-micron porosity was placed in a membrane cell. Distilled water was pumped through the membrane in a dead-end setup until the flux through the membrane was consistent. The transmembrane pressure was 4.35 psi. The permeate was collected in a separate container. After the flux stabilized the system was drained and loaded with a potassium phosphate monobasic water solution at a concentration of ~3 mg/L P. The pump was turned on. The flow was initially cross flow to flush out the tubes between the feed tank and the membrane surface. After flowing for a few seconds, the valve was closed to operate in dead-end mode. The permeate was collected in ~23 ml fractions. Fractions were analyzed for P content. The feed container was also sampled, filtered through a 0.2-micron filter and analyzed for P content. This constitutes the control.

All valves were then opened to run in cross flow mode. The membrane was then coated as in Example 2. The system was then operated in dead-end mode for approximately 30 min. The permeate was collected in a separate container.

Figure 9:
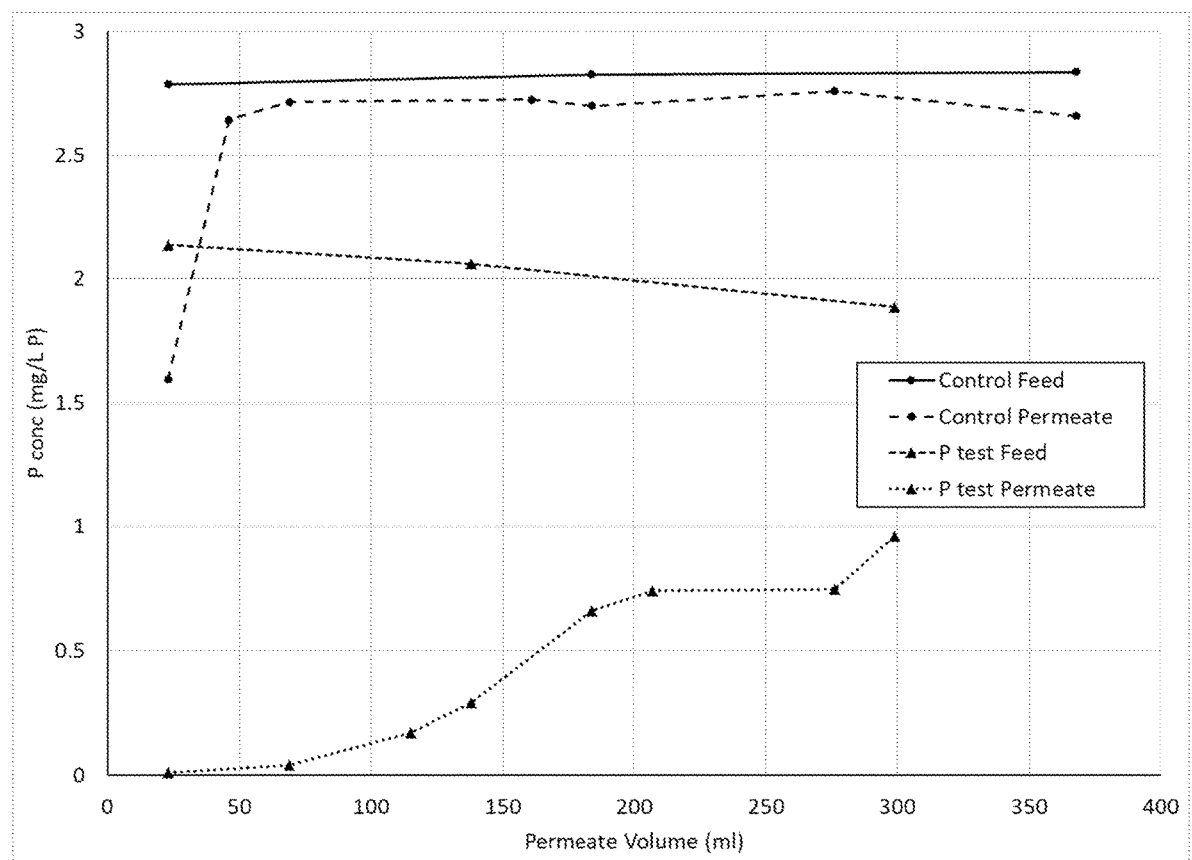
FIG. 9 graphically represents the sampled feed and permeate P concentrations (mg/L P) for the control and test for Example 7.

The system was then drained and rinsed with distilled water. The system was then loaded with a potassium phosphate monobasic water solution at a concentration of ~3 mg/L P. The system was started as in the control and the permeate was collected in ~23 ml fractions. Fractions were analyzed for P content. The feed container was also sampled, filtered through a 0.2-micron filter and analyzed for P content. The analytical results are listed in the table below and graphically depicted in FIG. 9.

As depicted, it is evident that in the absence of the rare earth coating, the phosphate is free to permeate the membrane and the permeate concentration quickly approaches the feed concentration. After exposure to rare earth the permeate concentration increases at a much slower rate. Furthermore, at the conclusion of this example the permeate concentration was significantly lower than the feed concentration. This indicates the coated membrane is restricting the permeation of phosphate.

| | Control | | Example 7 | |
|---|---|---|---|---|
| Permeate volume (ml) | Feed P conc. (mg/L P) | Permeate P conc. (mg/L P) | Feed P conc. (mg/L P) | Permeate P conc. (mg/L P) |
| 23 | 2.785 | 1.595 | 2.135 | 0.01 |
| 46 | | 2.645 | | |
| 69 | | 2.715 | | 0.04 |
| 115 | | | | 0.17 |
| 138 | | | 2.06 | 0.29 |
| 161 | | 2.725 | | |
| 184 | 2.825 | 2.7 | | 0.66 |
| 207 | | | | 0.74 |
| 276 | | 2.76 | | 0.745 |
| 299 | | | 1.885 | 0.96 |
| 368 | 2.835 | 2.66 | | |

Example 8

A hollow fiber PVDF membrane with 0.04-micron porosity was constructed using 27 fibers in a u-shaped setup. The length of each fiber was approximately 9 inches. Distilled water was pumped through the membrane using a peristaltic pump set at 8 ml/min for 30 min. The transmembrane pressure was 0.435 psi. The permeate was collected in a separate container. The membrane was then removed, and the tubing was drained. The membrane was then placed in a potassium phosphate monobasic water solution at a concentration of ~3 mg/L P. This solution was then pumped through the membrane at 8 ml/min. The permeate was collected in ~23 ml fractions. Fractions were analyzed for P content. The feed container was also sampled, filtered through a 0.45-micron filter and analyzed for P content. This constitutes the control.

The membrane was then coated as in example 1. Filtration continued for approximately 12 hrs.

Figure 10:
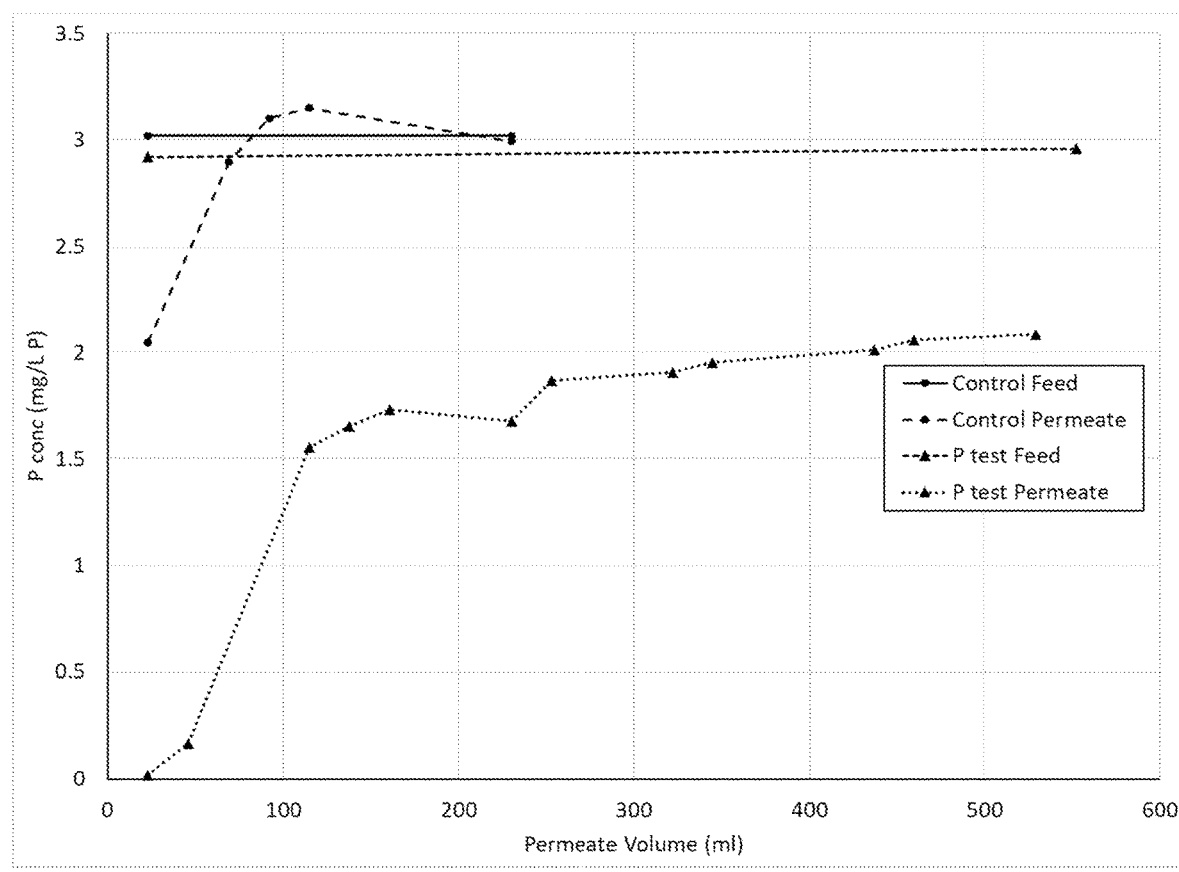
FIG. 10 graphically represents the sampled feed and permeate P concentrations (mg/L P) for the control and test for Example 8.

The membrane was removed, the tubing drained, and rinsed with distilled water. The membrane was then placed in a potassium phosphate monobasic water solution at a concentration of ~3 mg/L P. The permeate was collected in ~23 ml fractions. Fractions were analyzed for P content. The feed container was also sampled, filtered through a 0.2-micron filter and analyzed for P content. The analytical results are listed in the table below and graphically depicted in FIG. 10.

As depicted, it is evident that in the absence of the rare earth coating, the phosphate is free to permeate the membrane and the permeate concentration quickly approaches the feed concentration. After exposure to rare earth the permeate concentration increases at a much slower rate. Furthermore, at the conclusion of this example the permeate concentration was significantly lower than the feed concentration. This indicates the coated membrane is restricting the permeation of phosphate.

| | Control | | Example 8 | |
|---|---|---|---|---|
| Permeate volume (ml) | Feed P conc. (mg/L P) | Permeate P conc. (mg/L P) | Feed P conc. (mg/L P) | Permeate P conc. (mg/L P) |
| 23 | 3.02 | 2.05 | 2.92 | 0.02 |
| 46 | | | | 0.165 |
| 69 | | 2.9 | | |
| 92 | | 3.1 | | |
| 115 | | 3.15 | | 1.555 |
| 138 | | | | 1.655 |
| 161 | | | | 1.735 |
| 230 | 3.02 | 2.995 | | 1.68 |
| 253 | | | | 1.87 |
| 322 | | | | 1.91 |
| 345 | | | | 1.955 |
| 437 | | | | 2.015 |
| 460 | | | | 2.06 |
| 529 | | | | 2.085 |
| 552 | | | 2.96 | 2.12 |

Example 9

A hollow fiber PVDF membrane with 0.04-micron porosity is constructed using 27 fibers in a u-shaped setup. The length of each fiber is approximately 9 inches. Distilled water is pumped through the membrane using a peristaltic pump set at 8 ml/min for 30 min. The transmembrane pressure is 0.435 psi. The permeate is collected in a separate container. The membrane is then removed, and the tubing is drained. The membrane is then placed in a water solution containing PFOA (150 ng/L) and PFOS (9.1 ng/L). The solution is pumped through the membrane at 8 ml/min. The permeate is collected in ~200 ml fractions which is the amount needed for analysis. The feed container is also sampled, filtered through a 0.45-micron filter and analyzed for PFAS content by liquid chromatography/tandem mass spectrometry (LC/MS/MS) EPA method 537.1. This constitutes the control.

The membrane is then coated as in example 1. Filtration continues for approximately 12 hrs.

The membrane is removed, the tubing drained, and rinsed with distilled water. The membrane is then placed in a water solution containing PFOA (150 ng/L) and PFOS (9.1 ng/L). The permeate is collected in ~200 ml fractions. Fractions are analyzed for PFAS content. The feed container is also sampled, filtered through a 0.45-micron filter and analyzed for PFAS content. Sample analytical results are listed in the table below. As depicted it is evident that in the absence of the rare earth coating, the PFAS is free to permeate the membrane and the permeate concentration quickly approaches the feed concentration. After exposure to rare earth the permeate concentration is significantly lower than the feed concentration. This indicates the coated membrane is restricting the permeation of PFAS.

| | Control | | Example 9 | |
|---|---|---|---|---|
| Permeate volume (ml) | Feed PFOA/PFOS conc. (ng/L) | Permeate PFOA/PFOS conc. (ng/L) | Feed PFOA/PFOS conc. (ng/L) | Permeate PFOA/PFOS conc. (ng/L) |
| 200 | 150/9.1 | 150/9.1 | 150/9.1 | 75/4.5 |
| 400 | 150/9.1 | 150/9.1 | 150/9.1 | 80/6 |

Example 10

A hollow fiber PVDF membrane with 0.04-micron porosity is constructed using 27 fibers in a u-shaped setup. The length of each fiber is approximately 9 inches. Distilled water is pumped through the membrane using a peristaltic pump set at 8 ml/min for 30 min. The transmembrane pressure is 0.435 psi. The permeate is collected in a separate container. The membrane is then removed, and the tubing is drained. The membrane is then placed in a water solution containing ~3 mg/L As as arsenate. The solution is pumped through the membrane at 8 ml/min. The permeate is collected in ~23 ml fractions. The feed container is also sampled, filtered through a 0.45-micron filter and analyzed for As content using ICP-AES as described in EPA method 200.7. This constitutes the control.

The membrane is then coated as in example 1. Filtration continues for approximately 12 hrs. The membrane is removed, the tubing drained, and rinsed with distilled water. The membrane is then placed in a water solution containing ~3 mg/L As as arsenate. The permeate is collected in ~23 ml fractions. Fractions are analyzed for As content. The feed container is also sampled, filtered through a 0.45-micron filter and analyzed for As content. Sample analytical results are listed in the table below. As depicted it is evident that in the absence of the rare earth coating, the arsenic is free to permeate the membrane and the permeate concentration quickly approaches the feed concentration. After exposure to rare earth the permeate concentration increases at a much slower rate. Furthermore, at the conclusion of this example the permeate concentration was significantly lower than the feed concentration. This indicates the coated membrane is restricting the permeation of arsenic.

|  | Control | | Example 10 | |
| --- | --- | --- | --- | --- |
| Permeate volume (ml) | Feed As conc. (mg/L As) | Permeate As conc. (mg/L As) | Feed As conc. (mg/L As) | Permeate As conc. (mg/L As) |
| 23 | 2.9 | 2.0 | 2.9 | 0.01 |
| 46 | 2.9 | 2.85 | 2.9 | 0.15 |

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

It will be clear that the compositions and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A method of making a membrane for water filtration comprising:
    (a) providing a membrane with a pore size of approximately 0.001 to 0.9 micron;
    (b) exposing the membrane to a solution of phosphate by passing the phosphate solution through the membrane and exposing the membrane to a rare earth salt solution by passing the rare earth salt solution through the membrane or exposing the membrane to a rare earth phosphate slurry; and
    (c) providing a membrane with a rare earth phosphate coating that limits contaminants permeability through the membrane.

2. The method of claim 1, wherein the rare earth salt solution or the rare earth phosphate slurry is in water.

3. The method of claim 1, wherein the membrane is polyvinylidene difluoride (PVDF), polyethersulfone (PES), polysulfone (PS), polyacrylonitrile (PAN), polyvinylchloride (PVC), polyethylene (PE), or polypropylene (PP).

4. The method of claim 2, wherein the amount of rare earth in the water is from about 0.0005 to about 3.0 mmol RE/L of water.

5. The method of claim 1, wherein the amount of rare earth is from about 0.0001 mmol RE/m$^2$ to 0.05 mmol RE/m$^2$ of the membrane.

6. The method of claim 1, wherein in step (b) the rare earth salt solution is a rare earth chloride solution.

7. The method of claim 1, wherein the exposing step (b) is repeated one or more times after a period of time.

8. A method of treating water to remove contaminants comprising:
    providing a membrane with a pore size of approximately 0.001 to 0.9 micron;
    creating a membrane with a rare earth phosphate coating associated with the surface that limits contaminants permeability through the membrane by (i) exposing the membrane to a solution of phosphate by passing the phosphate solution through the membrane and exposing the membrane to a rare earth salt solution by passing the rare earth salt solution through the membrane or (ii) exposing the membrane to a rare earth phosphate slurry;
    passing a water stream containing a first concentration of one or more contaminants through the membrane; and
    obtaining a membrane permeate water stream having a permeate concentration of the one or more contaminants less than the first concentration.

9. The method of claim 8, wherein the contaminants are anions containing phosphorus, anions containing arsenic, PFAS, or mixtures thereof.

10. The method of claim 8, wherein the permeate concentration of one or more contaminants is a target concentration.

11. The method of claim 8, wherein the contaminants are anions containing phosphorus and the permeate concentration of phosphorus is about 0.01 mg/L to about 1.0 mg/L.

12. The method of claim 8, wherein the contaminants are anions containing phosphorus and the membrane permeate stream has a permeate concentration of phosphorus equal to or less than a target concentration of phosphorus.

13. The method of claim 8, wherein the contaminants are anions containing phosphorus and the method further comprises the steps of setting a target concentration of phosphorus for the permeate; monitoring the permeate for the phosphorus concentration; and repeating the exposing step to establish the rare earth phosphate coating if the phosphorus concentration of the permeate exceeds the target concentration.

14. A membrane made by the method of claim 1, wherein the membrane has rare earth phosphate coating.

15. The membrane of claim 14, wherein the amount of rare earth phosphate is from about 0.0001 mmol RE/$m^2$ to 0.05 mmol RE/$m^2$ of the membrane.

16. The method of claim 1, wherein the rare earth phosphate of the rare earth phosphate coating is selected from phosphates of cerium, lanthanum, yttrium, and mixtures thereof.

17. The method of claim 8, wherein the membrane is polyvinylidene difluoride (PVDF), polyethersulfone (PES), polysulfone (PS), polyacrylonitrile (PAN), polyvinylchloride (PVC), polyethylene (PE), or polypropylene (PP).

18. The method of claim 8, wherein the rare earth phosphate of the rare earth phosphate coating is selected from phosphates of cerium, lanthanum, yttrium, and mixtures thereof.

* * * * *